(12) United States Patent
Korcz et al.

(10) Patent No.: US 10,574,045 B2
(45) Date of Patent: Feb. 25, 2020

(54) HINGED MUD RING ASSEMBLY

(71) Applicant: Hubbell Incorporated, Shelton, CT (US)

(72) Inventors: Krzysztof Korcz, Granger, IN (US); Steven Johnson, Buchanan, MI (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/544,556

(22) Filed: Aug. 19, 2019

(65) Prior Publication Data

US 2019/0372323 A1    Dec. 5, 2019

Related U.S. Application Data

(63) Continuation of application No. 15/899,008, filed on Feb. 19, 2018, now Pat. No. 10,389,097.

(60) Provisional application No. 62/460,297, filed on Feb. 17, 2017.

(51) Int. Cl.
| | |
|---|---|
| *H02G 3/14* | (2006.01) |
| *H02G 3/12* | (2006.01) |
| *H01R 9/24* | (2006.01) |
| *H01R 13/502* | (2006.01) |
| *H02G 3/16* | (2006.01) |

(52) U.S. Cl.
CPC ............ *H02G 3/125* (2013.01); *H01R 9/24* (2013.01); *H01R 13/502* (2013.01); *H02G 3/121* (2013.01); *H02G 3/14* (2013.01); *H02G 3/16* (2013.01)

(58) Field of Classification Search
CPC ....................................................... H03G 3/14
See application file for complete search history.

(56) References Cited

U.S. PATENT DOCUMENTS

| | | | |
|---|---|---|---|
| 6,583,359 B1 * | 6/2003 | Cabello-Colon | H02G 3/14 174/55 |
| 7,235,740 B2 * | 6/2007 | Dinh | H02G 3/088 174/66 |
| 7,598,453 B1 * | 10/2009 | Shotey | H02G 3/14 174/66 |
| 7,728,226 B2 * | 6/2010 | Drane | H01H 21/085 174/66 |
| 9,329,576 B1 * | 5/2016 | Baldwin | G04B 37/00 |
| 9,595,819 B1 * | 3/2017 | Bonino | H02G 3/088 |

(Continued)

*Primary Examiner* — Hung V Ngo
(74) *Attorney, Agent, or Firm* — Michael Best & Friedrich, LLP

(57) ABSTRACT

A mud ring assembly for supporting an electrical device including a base member configured to be coupled to a junction box having a first corner and a second corner. The base member has a perimeter configured to extend around the first corner and not reach the second corner so that the base member is not positioned above the second corner. The mud ring assembly also includes a movable member configured to support the electrical device. The movable member is pivotably connected to the base member and pivotable relative to the base member between a closed position in which a back of the electrical device is enclosed in the junction box and an open position permitting access to the back of the electrical device. The movable member is couplable at a second portion of the junction box to selectively secure the movable member in the closed position.

16 Claims, 18 Drawing Sheets

(56) References Cited

U.S. PATENT DOCUMENTS

| | | | |
|---|---|---|---|
| 2008/0236859 A1* | 10/2008 | de la Borbolla | H02G 3/14 174/66 |
| 2011/0005800 A1 | 1/2011 | Magno, Jr. | |
| 2013/0248243 A1* | 9/2013 | Dinh | H02G 1/00 174/535 |
| 2013/0319715 A1* | 12/2013 | Korcz | H02G 3/14 174/50 |
| 2015/0236488 A1* | 8/2015 | Scanzillo | H02G 3/14 174/67 |

* cited by examiner

DETAIL B
SCALE 2 : 1

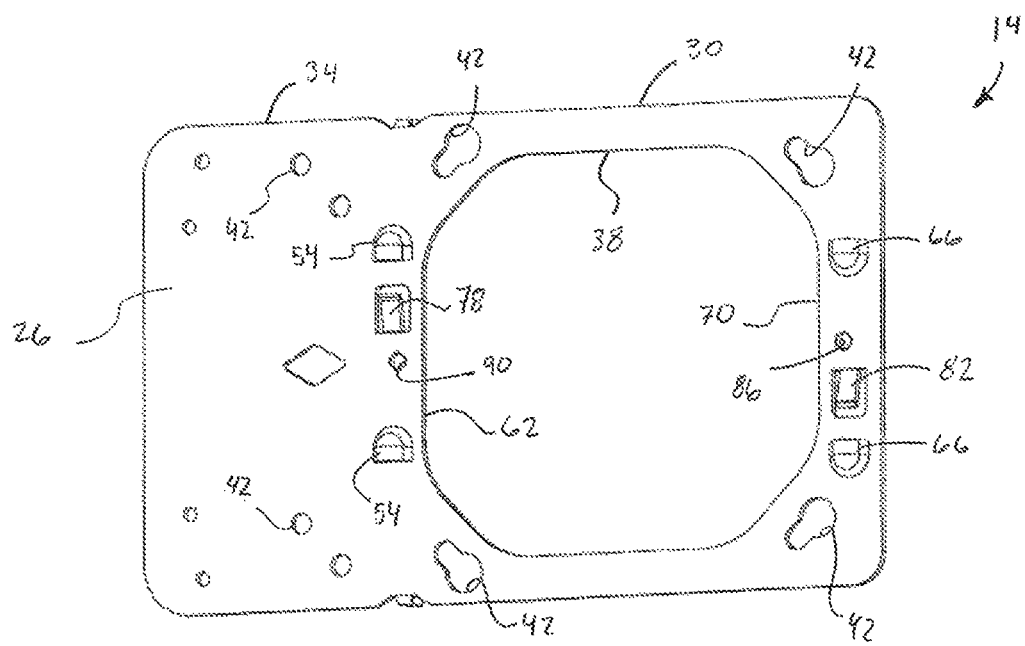
BASE PLATE      FIG. 5
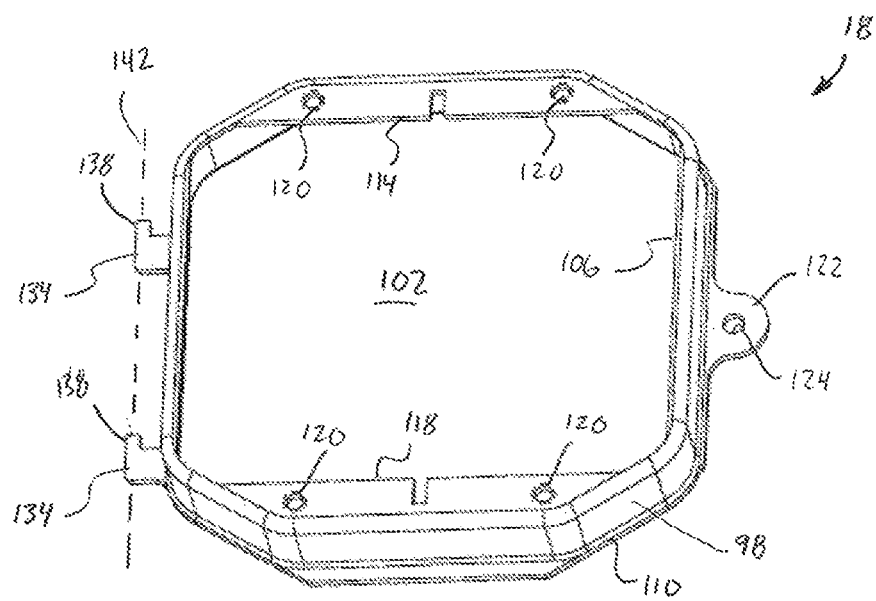
FIG. 6

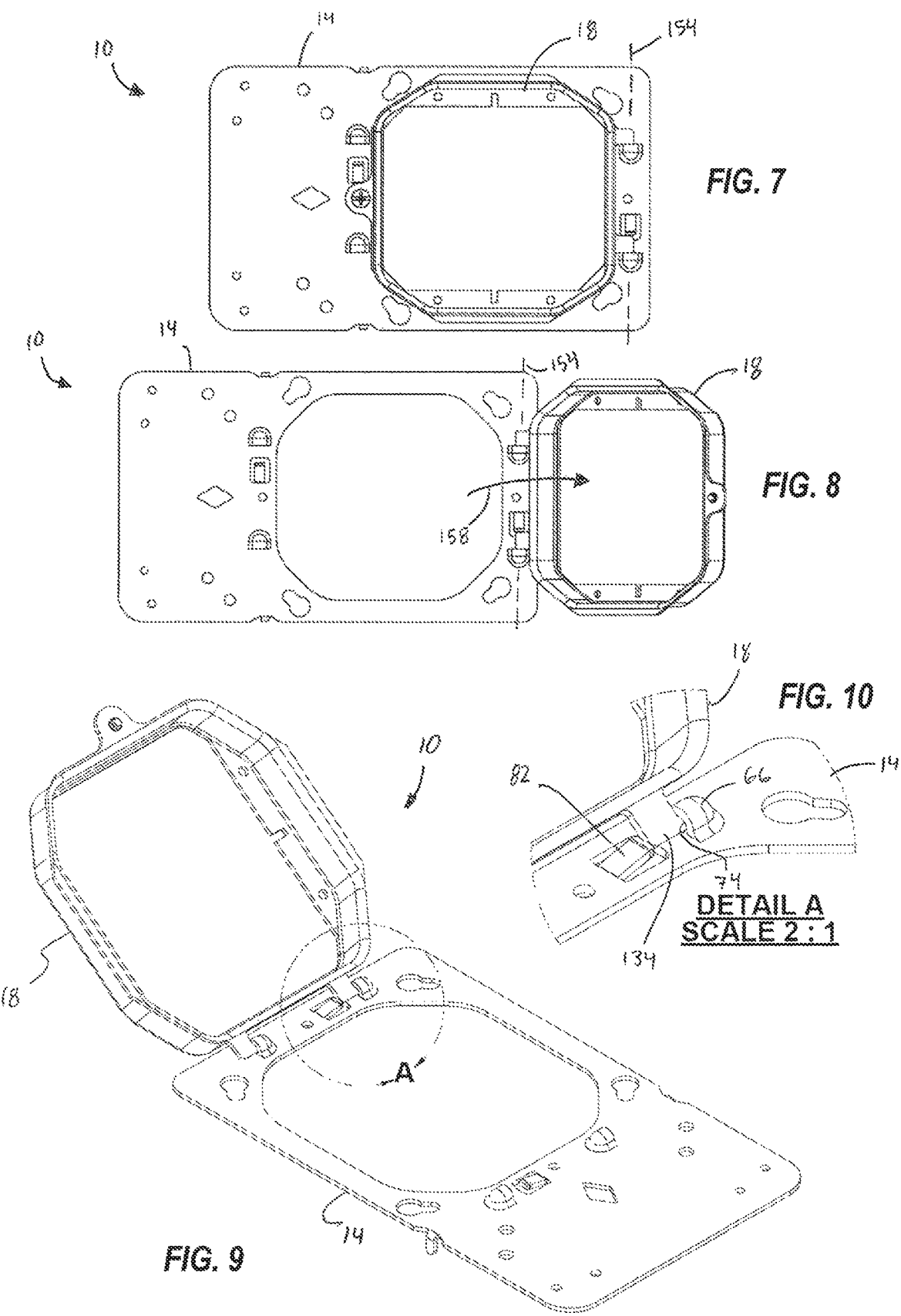

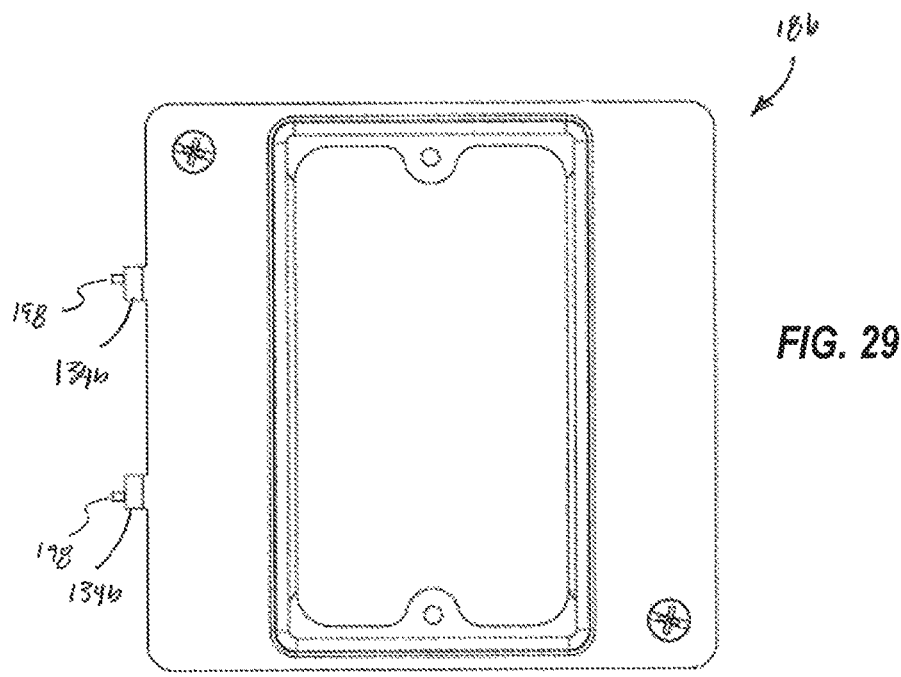
FIG. 29
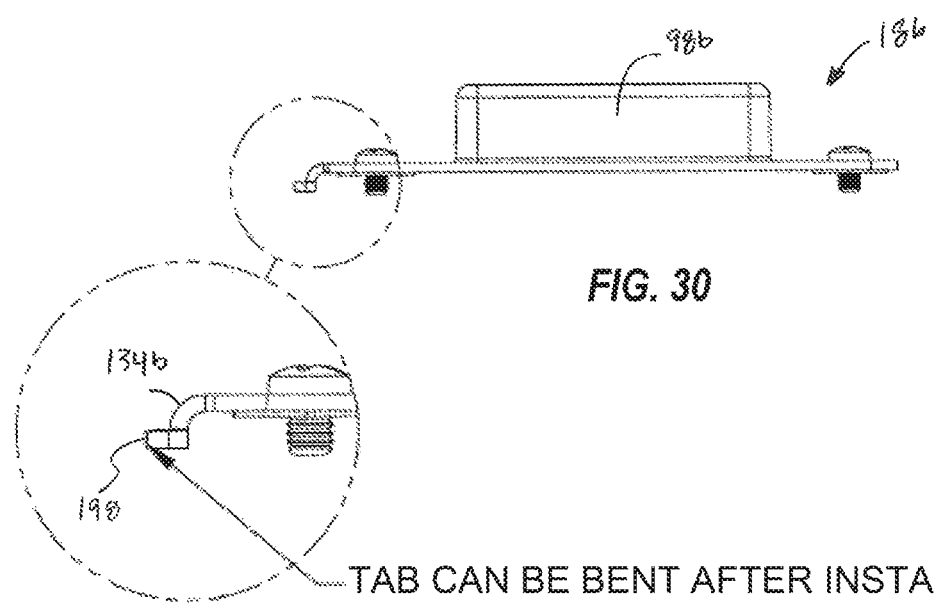
FIG. 30
TAB CAN BE BENT AFTER INSTALLATION
FIG. 31

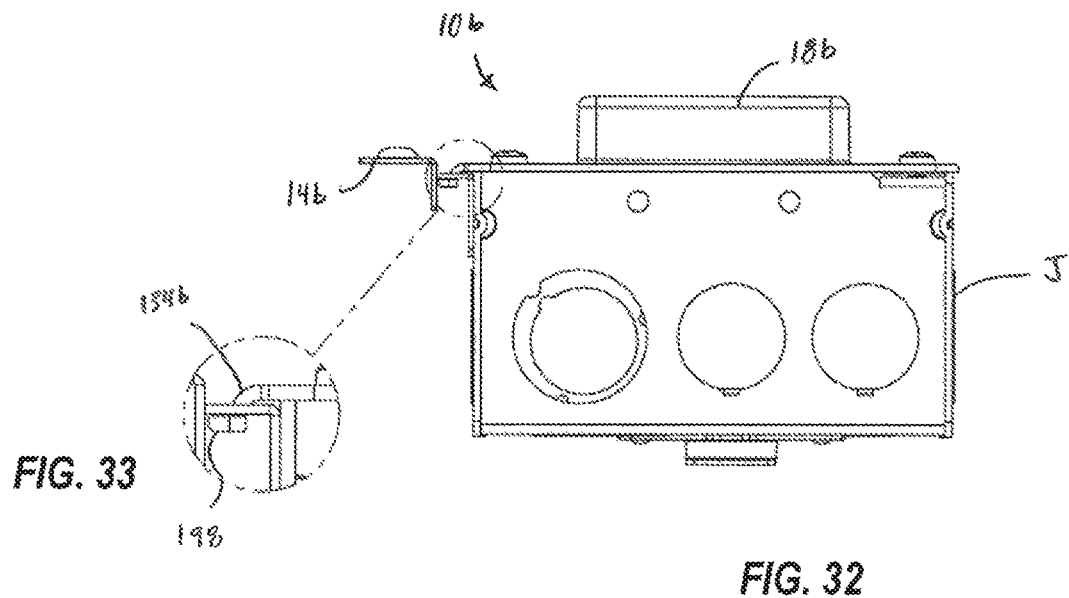
FIG. 33
FIG. 32
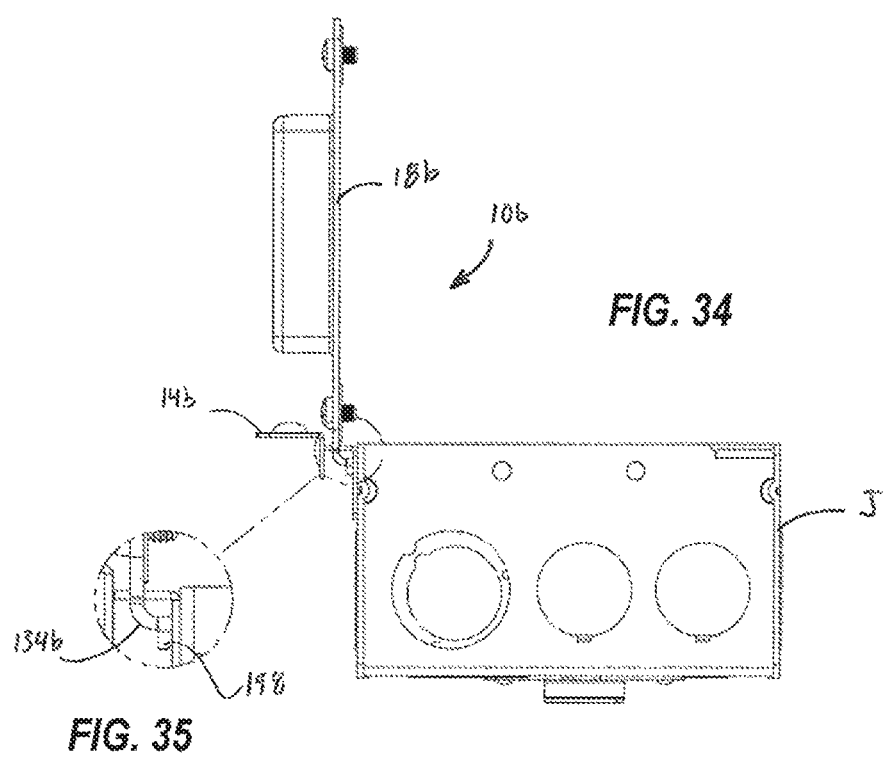
FIG. 34
FIG. 35

HINGED MUD RING ASSEMBLY

CROSS-REFERENCE TO RELATED APPLICATIONS

This application is a continuation of prior-filed, co-pending U.S. patent application Ser. No. 15/899,008, filed Feb. 19, 2018, which claims the benefit of prior filed U.S. Provisional Patent Application No. 62/460,297, filed Feb. 17, 2017. The entire contents of these applications are incorporated by reference herein.

BACKGROUND

The present disclosure relates to mud rings, and particularly to hinged mud ring assemblies.

Electrical devices (e.g., electrical outlets, switches, and others) are typically installed in a wall or ceiling. A gang or junction box is typically secured to a stud or support beam inside the wall or ceiling. The electrical device is then secured in the box in electrical communication with one or more electrical conductors so that the electrical device extends or protrudes from the wall or ceiling. In this manner, any exposed portion of the electrical conductor and its connection to the electrical device is shielded within the box. Plaster rings, extension rings, and extenders, commonly known as mud rings, are typically attached to the box prior to the installation of sheet rock, wall board, or other covering surface material.

SUMMARY

In one aspect, a mud ring assembly is provided for supporting an electrical device. The mud ring assembly including a base member configured to be coupled to a junction box and including a planar portion defining an opening extending through the planar portion; a movable member configured to support the electrical device, the movable member including a wall enclosing a space receiving the electrical device; a first hinge feature connected to the base member adjacent a first side of the opening; a second hinge feature connected to the base member adjacent a second side of the opening; and a third hinge feature connected to the movable member. The movable member is selectively pivotably couplable to the base member in a first arrangement in which the third hinge feature engages the first hinge feature and a second arrangement in which the third hinge feature engages the second hinge feature. In both the first and second arrangements, the movable member is pivotable relative to the base member between a closed position and an open position. The movable member is positioned over the opening in the closed position, and the movable member permits access to the opening in the open position.

In another aspect, a mud ring assembly is provided for supporting an electrical device. The mud ring assembly including a base member including a planar portion, the base member configured to be coupled to a first portion of a junction box; and a movable member configured to support the electrical device, the movable member including a wall enclosing a space receiving the electrical device. The movable member is pivotably connected to the base member and pivotable relative to the base member between a closed position in which a back of the electrical device is enclosed in the junction box and an open position permitting access to the back of the electrical device. The movable member is couplable at a second portion of the junction box to selectively secure the movable member in the closed position.

In yet another aspect, a mud ring assembly is provided for supporting an electrical device. The mud ring assembly including a base member configured to be coupled to a junction box and including a planar portion having a hinge aperture; and a movable member configured to support the electrical device, the movable member including a wall enclosing a space receiving the electrical device. The movable member further includes a hinge tab receivable in the hinge aperture to pivotably couple the movable member to the base member, the movable member pivotable between a closed position in which a back of the electrical device is enclosed within the junction box and an open position in which the back of the electrical device is accessible. A hinge projection extends from the hinge tab and is bendable between a first position in which the hinge tab is permitted to be inserted into the hinge slot and a second position in which the hinge tab is secured within the hinge slot.

In still another aspect, a mud ring assembly for supporting an electrical device includes a base member, a first hinge feature, a second hinge feature, and a movable member. The base member includes a planar portion defining an opening extending through the planar portion. The first hinge feature is connected to the base member adjacent a first side of the opening. The second hinge feature is connected to the base member adjacent a second side of the opening. The movable member is configured to support the electrical device. The movable member includes a wall enclosing a space receiving the electrical device, and further includes a third hinge feature. The movable member is selectively and pivotably couplable to the base member in a first arrangement and a second arrangement, and the movable member is pivotable relative to the base member between a closed position and an open position in both the first arrangement and the second arrangement. The third hinge feature engages the first hinge feature in the first arrangement, and the third hinge feature engages the second hinge feature in the second arrangement. The movable member is positioned over the opening in the closed position and the movable member permits access to the opening in the open position.

The above-described and other features and advantages of the present disclosure will be appreciated and understood by those skilled in the art from the following detailed description and drawings.

BRIEF DESCRIPTION OF THE DRAWINGS

FIG. 5 is a perspective view of a base member of the hinged mud ring assembly of FIG. 1.

FIG. 6 is a perspective view of a movable member of the hinged mud ring assembly of FIG. 1.

FIG. 7 is a front view of the mud ring assembly of FIG. 1 showing the hinged mud ring assembly in a second arrangement and in a closed position.

FIG. 8 is a front view of the mud ring assembly of FIG. 1 showing the hinged mud ring assembly in the second arrangement and in an open position.

FIG. 9 is a perspective view of the mud ring assembly of FIG. 1 showing the hinged mud ring assembly in the second arrangement and in the open position.

FIG. 10 is an enlarged perspective view of a portion of the mud ring assembly of FIG. 1 taken at Area A in FIG. 9.

FIG. 29 is a front view of the movable member of FIG. 27 showing each of the securement projections in a bent position.

FIG. 30 is a side view of the movable member of FIG. 27 showing each of the securement projections in the bent position.

FIG. 31 is an enlarged view of the movable member of FIG. 27 showing the securement projections each in the bent position.

FIG. 32 is a side view of the hinged mud ring assembly of FIG. 24 showing the hinged mud ring assembly in the closed position.

FIG. 33 is an enlarged view of the hinged mud ring assembly of FIG. 32.

FIG. 34 is a side view of the hinged mud ring assembly of FIG. 24 showing the hinged mud ring assembly in the open position.

FIG. 35 is an enlarged view of the hinged mud ring assembly of FIG. 34.

DETAILED DESCRIPTION

Figure 1:
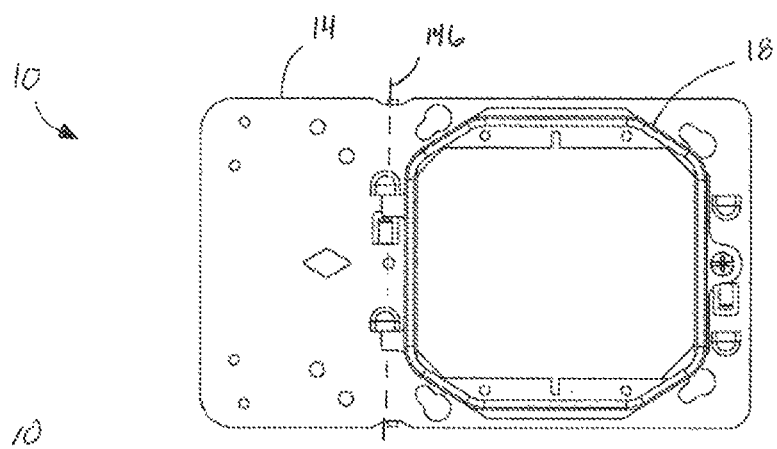
FIG. 1 is a front view of a hinged mud ring assembly in accordance with a first embodiment showing the hinged mud ring assembly in a first arrangement and in a closed position.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

FIGS. 1-10 illustrate a mud ring assembly 10 according to one embodiment. The mud ring assembly 10 includes a first portion or base member 14 and a second portion or movable member 18. The mud ring assembly 10 may be coupled to a junction box (similar to the junction boxes J shown in FIGS. 24-26, 32-33, 37-42, and 45-46) positioned in a wall or ceiling and may support one or more electrical devices including, but not limited to, an electric outlet (not shown), switch, sensor, etc. The mud ring assembly 10 also acts as a cover for the junction box (not shown) and allows access to the front and back of the electrical device during installation, wiring, and maintenance, while allowing a user to use both hands (as compared to holding the device in one hand and working with the other hand, or allowing the electrical device to hang from its wiring during installation). In the embodiment of FIGS. 1-10, the mud ring assembly 10 is a double gang mud ring assembly for supporting a pair of electrical devices. In other embodiments (e.g., shown in FIGS. 11-23), the mud ring assembly 10a may be a single gang mud ring assembly for supporting a single electrical device.

As shown in FIG. 5, the base member 14 includes a planar portion or body 26 having a first portion 30 defining an access opening 38 and a second portion 34 for mounting the base member 14 (e.g., to a stud or other support). The second portion 34 defines a plurality of fastener holes 42 for receiving fasteners (e.g., wood screws) to couple the mud ring assembly 10, and thus, the junction box to a stud or other structure. The planar body 26 further includes slots 46 (e.g., keyhole slots) for coupling the base member 14 to a junction box.

The base member 14 further includes a pair of first hinge bodies 54 projecting from a first side 46 of the planar body 26 adjacent a first edge 62 of the access opening 38 and a pair of second hinge bodies 66 projecting from the first side 58 of the planar body 26 adjacent a second edge 70 of the access opening 38, where the second edge 70 is opposite the first edge 62. Accordingly, the first and second hinge bodies 54, 66 are on opposite sides of the access opening 38. Each of the hinge bodies 54, 66 defines a corresponding hinge recess 74 (see FIG. 4).

Figure 4:
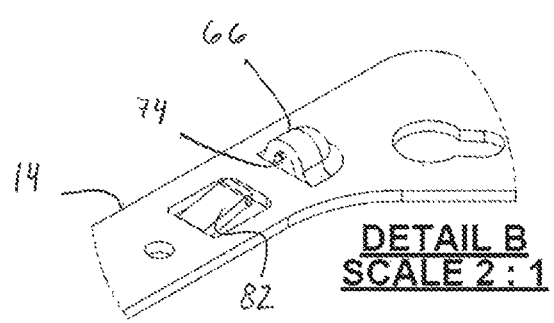
FIG. 4 is an enlarged perspective view of a portion of the hinged mud ring assembly of FIG. 1 taken at Area B in FIG. 3.

Referring again to FIG. 5, the base member 14 further includes a first resilient tab 78 adjacent one of the first hinge bodies 54 and a second resilient tab 82 adjacent of the second hinge bodies 66. Each of the first and second resilient tabs 78, 82 is bent to extend upwardly from the first side 46 of the planar body 26 at a small angle relative to the planar body 26, as best shown in FIG. 4. Each of the first and second hinge bodies 54, 66 is angled toward the hinge recess 74 of the corresponding adjacent one of the first and second hinge bodies 54, 66. In some embodiments, there may be a first resilient tab 78 adjacent each of the first hinge bodies 54 and a second resilient tab 82 adjacent each of the second hinge bodies 66.

As shown in FIG. 5, the planar body 26 further defines first and second closure apertures 86, 90. The first closure aperture 86 is adjacent the second edge 70 on the opposite side of the access opening 38 from the first hinge bodies 54 and the first resilient tab 78. The second closure aperture 90 is adjacent the first edge 62 of the access opening 38 on the opposite side of the access opening 38 from the second hinge bodies 66 and the second resilient tab 82.

Referring to FIG. 6, the movable member 18 may be formed as a closed wall 98 extending around an enclosed space 102. The wall 98 is dimensioned to fit around the access opening 38 of the base member 14. In the illustrated embodiment, the movable member 18 includes a first peripheral edge 106 and a second peripheral edge 110. A first flange 114 is positioned on one side of the wall 98 and is generally coplanar with the first edge 62. The first flange 114 protrudes from the wall 98 into the enclosed space 102. A second flange 118 is positioned on another side of the wall 98 opposite the side to which the first flange 114 is connected. The second flange 118 is generally coplanar with the first peripheral edge 106 and the first flange 114, and the second flange 118 protrudes from the wall 98 in a direction into the enclosed space 102. Each of the first flange 114 and the second flange 118 includes a pair of device fastener openings 120 each for receiving a fastener coupled to an electrical device (not shown).

Figure 3:
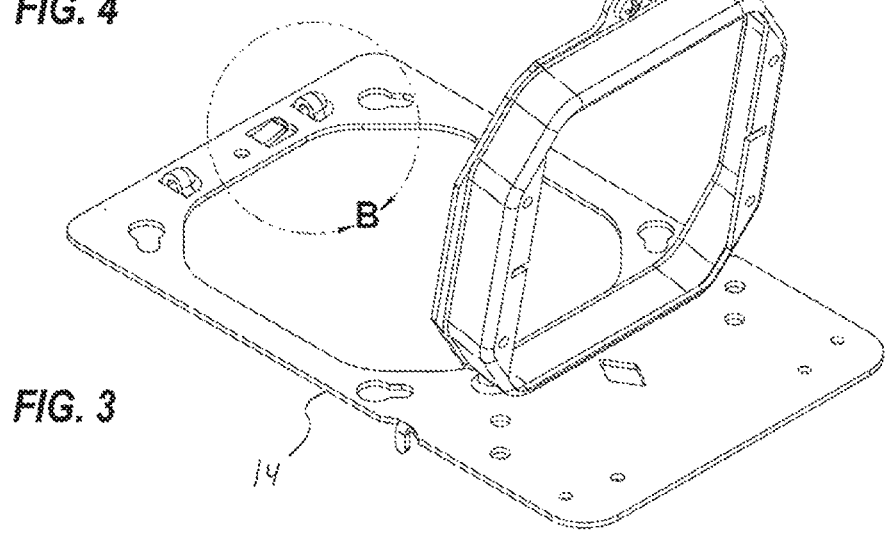
FIG. 3 is a perspective view of the hinged mud ring assembly of FIG. 1 showing the hinged mud ring assembly in the first arrangement and in the open position.

The movable member 18 further includes a closure flange 122 extending from the second peripheral edge 110 of the wall 98 on a side perpendicular to the sides that the first and second flanges 114, 118 extend from. The closure flange 122 defines a closure flange aperture 124 that receives a closure fastener 126 (FIG. 3). The movable member 18 further includes hinge tabs 134 protruding from the second peripheral edge 110 of the wall 98 on a side opposite the closure flange 122. The hinge tabs 134 are generally coplanar with the second peripheral edge 110. Each of the hinge tabs 134 includes a hinge projection 138 extending along a hinge axis 142 parallel to the adjacent side of the wall 98. The hinge tabs 134 are spaced apart along the hinge axis 142.

As shown in FIGS. 1-3 and 7-9, the movable member 18 can be pivotably coupled to the base member 14 in one of two arrangements. In the first arrangement (see FIGS. 1-3), the hinge tabs 134 are pivotably coupled to the base member 14 adjacent the first edge 62 of the access opening 38 by pivotal engagement with the first hinge bodies 54. In particular, each of the hinge recesses 74 of the first hinge bodies 54 receive a corresponding one of the hinge projections 138, such that the movable member 18 pivots about the hinge axis 142 between a closed position (FIG. 1), in which the movable member 18 is positioned around the access opening 38, to an open position (FIG. 2-3), in which the movable member 18 is pivoted away from the access opening 38. The first resilient tab 78 is bent inwardly by a corresponding one of the hinge tabs 134 as the hinge projection 138 is inserted into the hinge recess 74 of the first hinge body 54. Once the hinge projection 138 has been fully inserted into the hinge recess 74, the first resilient tab 78 springs back to its normal position to retain the hinge projection 138 within the hinge recess 74, while still allowing the movable member 18 to pivot about the hinge axis 142. The first resilient tab 78 may be manually depressed by an operator to release the hinge projection 138 from the hinge recess 74 and decouple the movable member 18 from the base member 14. When the movable member 18 is in the first arrangement and is pivoted to the closed position, the closure flange aperture 124 of the closure flange 122 aligns with the first closure aperture 86 such that the closure fastener 126 may be threadingly received in the first closure aperture 86 to secure the movable member 18 in the closed position relative to the base member 14, as best shown in FIG. 1.

In the second arrangement (see FIGS. 7-9), the hinge tabs 134 are pivotably coupled to the base member 14 adjacent the second edge 70 of the access opening 38 by the second hinge bodies 66 and the second resilient tab 82 in a similar manner as described above with respect to the first hinge bodies 54 and the first resilient tab 78. When the movable member 18 is in the second arrangement and pivoted to the closed position, the closure flange 122 aligns with the second closure aperture 90 of the base member 18 such that the closure fastener 126 may be threadingly received in the second closure aperture 90 to couple and secure the movable member 18 in the closed position relative to the base member 14, as best shown in FIG. 7.

Figure 2:
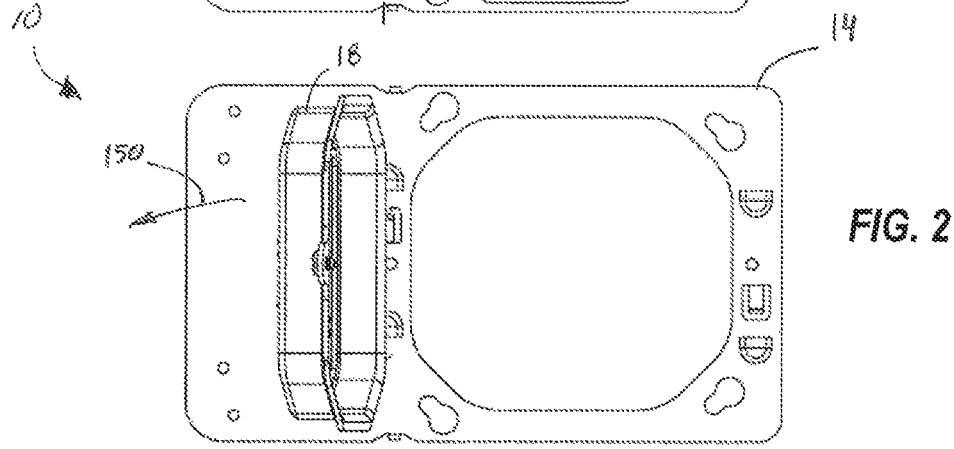
FIG. 2 is a front view of the hinged mud ring assembly of FIG. 1 showing the hinged mud ring assembly in the first arrangement and in an open position.

In the first arrangement, the movable member pivots from the closed position (FIG. 1) to the open position (FIGS. 2-3) in a first direction 150 about a first pivot axis 146 (e.g., clockwise and to the left as viewed from FIG. 2). In the second arrangement, the movable member 18 pivots from the closed position (FIG. 7) to the open position (FIGS. 8-9) in a second direction about a second pivot axis 154 (e.g., counterclockwise and to the right as viewed from FIG. 8). The first and second pivot axes 146, 154 in the first and second arrangements are parallel, but are non-coaxial.

During installation or maintenance, an operator can attach the movable member 18 to the base member 14 via the hinge tabs 134 to either the first or second hinge bodies 54, 66 depending on which way the operator would like the movable member 18 to pivot into the open position to provide access to the back of the electrical device, which is attached to the movable member 18 to pivot outwardly therewith. This may depend on the location of the junction box (e.g., at a corner where walls meet or on a stud).

In the illustrated embodiment, each of the hinge recesses 74 of the first hinge bodies 54 face in a first direction, while each of the hinge recesses 74 of the second hinge bodies 66 face in a second direction opposite the first direction, such that the hinge projections 138 need only extend in one direction from the hinge tabs 134. In some embodiments, the hinge recesses 74 of each of the first and second hinge bodies 66 may be facing each other while the hinge projections 138 extend outwardly away from each other along the hinge axis 142. Alternatively, the hinge recesses 74 of each of the first and second hinge bodies 66 may be facing away from each other while the hinge projections 138 extend inwardly toward each other along the hinge axis 142. In some embodiments, a hinge projection 138 may extend from each side of each of the hinge tabs 134 along the hinge axis 142.

In the illustrated embodiment, the hinge tabs 134 extend from the movable member 18 while the first and second hinge bodies 54, 66 are part of the base member 14. In alternate embodiments, the hinge bodies 54, 66 and the hinge tabs 134 may be switched. In particular, the first and second hinge bodies 66 of the base member 14 may be replaced with corresponding hinge tabs, while the hinge tabs 134 of the movable member 18 may be replaced with hinge bodies. Accordingly, each of the hinge tabs 134 and the hinge bodies 54, 66 can be considered as hinge features that are configured to cooperate to pivotably couple the movable member 18 with the base member 14.

Figure 14:
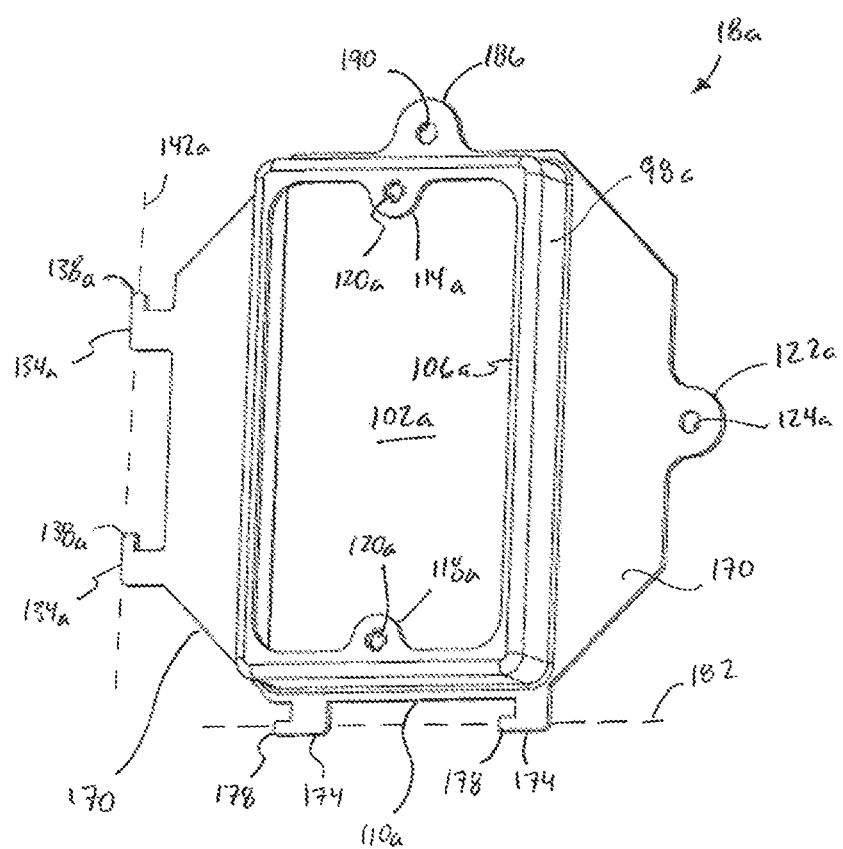
FIG. 14 is a perspective view of a movable member of the hinged mud ring assembly of the hinged mud ring assembly of FIG. 11.

FIGS. 11-23 illustrate a mud ring assembly 10a according to another embodiment. The mud ring assembly 10a is similar to the mud ring assembly 10 described above with respect to FIGS. 1-10, and for the sake of brevity only differences will be described in detail. Similar features are identified with similar reference numbers, plus "a". The mud ring assembly 10a is a single gang mud ring assembly for supporting a single electrical device (not shown). More specifically, the movable member 18a of FIG. 14 is substantially similar to the movable member 18 of FIG. 6 except that the wall 98a is a single gang member sized for supporting a single electrical device (as opposed to a double gang member sized for supporting two electrical devices, as shown in FIG. 6). In the illustrated embodiment, the base member 14a of the mud ring assembly 10a of FIGS. 11-23 is identical to the base member 14 of the mud ring assembly 10 of FIGS. 1-10. Using the same base member 14 for both mud ring assemblies 10, 10a of FIGS. 1-23 reduces the total number of different parts required to be manufactured for both single and double gang versions of the product. However, in alternate embodiments, the mud ring assembly 10a of FIGS. 11-23 may be constructed to better accommodate the movable member 18a of FIG. 14, which supports only a single electrical device (e.g., by including a base member in which the size of the access opening 38a is decreased to accommodate only a single electrical device), thus saving material and space.

As best shown in FIG. 14, the movable member 18a includes a pair of cover flanges 170 extending from the second peripheral edge 110a of the wall 98a on opposite sides of the enclosed spaced 102a. In some embodiments, the enclosed space 102a includes a volume of approximately 4.5 cubic inches (approximately 73 cubic centimeters); in other embodiments, the enclosed space may include a smaller or larger volume. The pair of cover flanges 170 are provided to cover the access opening 38a of the base member 14a around the wall 98a in the closed position (see FIGS. 11, 15, 18, and 21).

The movable member 18a further includes a pair of second hinge tabs 174 protruding from, the second peripheral edge 110a of the wall 98a on a side of the wall 98a perpendicular to the side that the pair of first hinge tabs 134a protrude from. Each of the second hinge tabs 174 includes a second hinge projection 178 extending along a second hinge axis 182 perpendicular to the first hinge axis 142 and parallel to the adjacent side of the wall 98. The second hinge tabs 174 are otherwise identical to the first hinge 134a. The movable member 18a further includes a second closure flange 186 extending from the second peripheral edge 110a of the wall 98a on a side opposite to the side that the second hinge tabs 174 protrude from.

Figure 11:
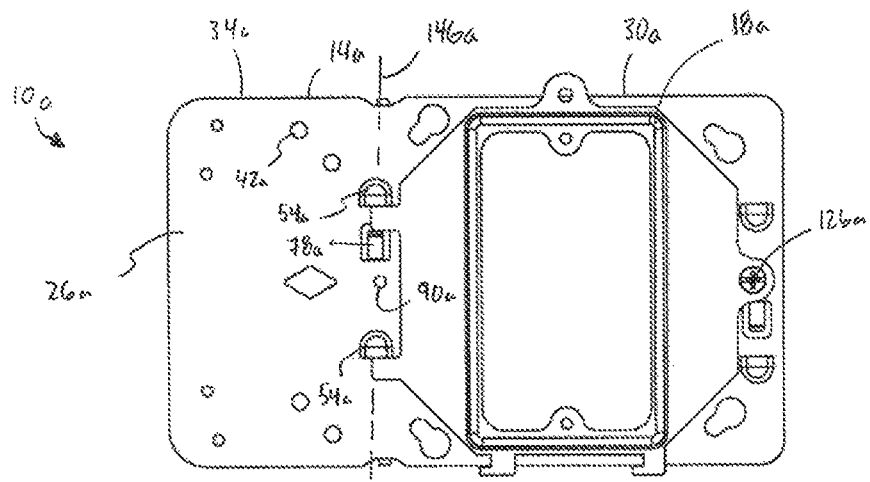
FIG. 11 is a front view of a hinged mud ring assembly in accordance with a second embodiment showing the mud ring assembly in a first arrangement and in a closed position.
Figure 12:
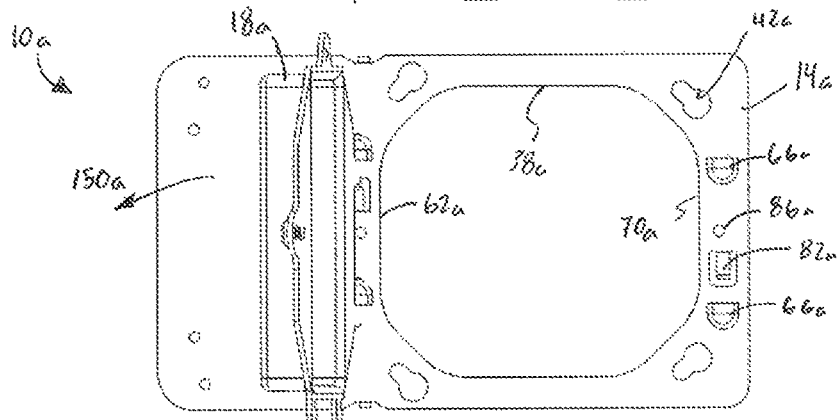
FIG. 12 is a front view of the hinged mud ring assembly of FIG. 11 showing the hinged mud ring assembly in the first arrangement and in an open position.
Figure 13:
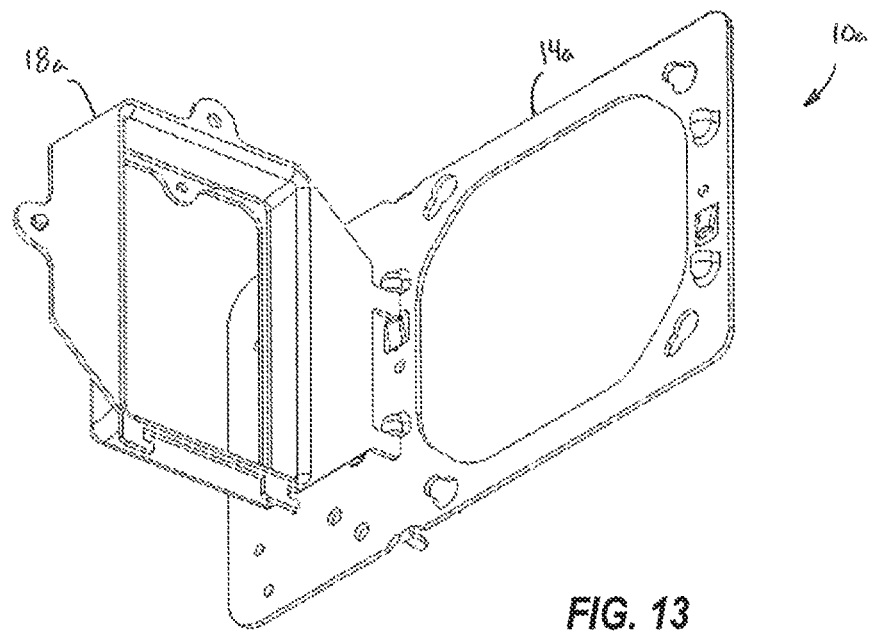
FIG. 13 is a perspective view of the hinged mud ring assembly of FIG. 11 showing the mud ring assembly in the first arrangement and in the open position.
Figure 15:
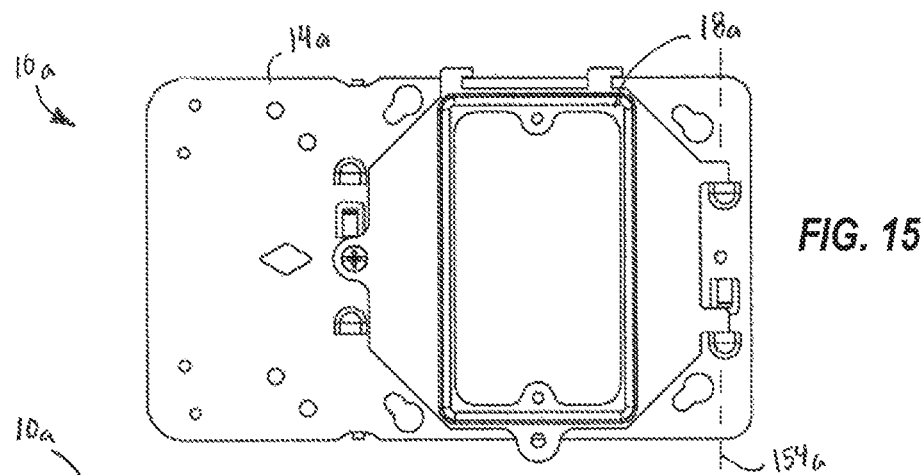
FIG. 15 is a front view of the hinged mud ring assembly of FIG. 11 showing the hinged mud ring assembly in a second arrangement and in a closed position.
Figure 16:
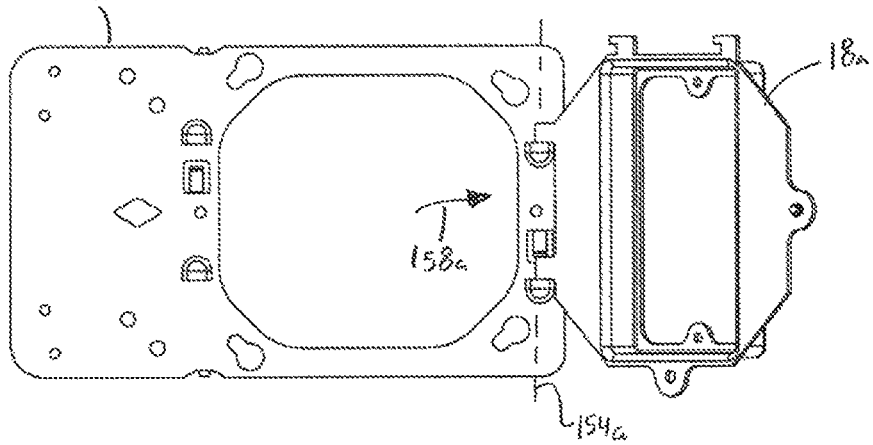
FIG. 16 is a front view of the hinged mud ring assembly of FIG. 11 showing the hinged mud ring assembly in the second arrangement and in an open position.
Figure 17:
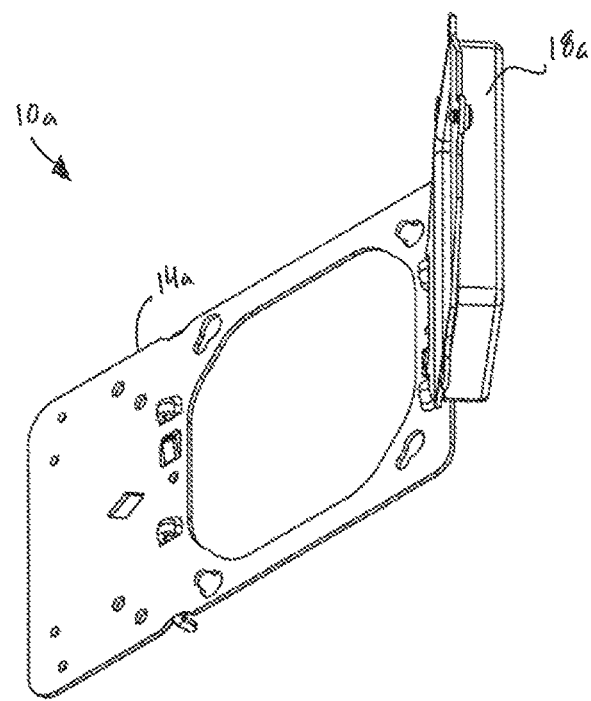
FIG. 17 is a perspective view of the hinged mud ring assembly of FIG. 11 showing the mud ring assembly in the second arrangement and in the open position.

As best shown in FIGS. 11-13 and 15-17, the movable member 18a may be coupled to either of the first and second hinge bodies 54a, 66a via the first hinge tabs 134a, in corresponding first and second arrangements, in the same manner as described above with respect to the mud ring assembly 10 of FIGS. 1-10. More specifically, in the first arrangement (FIGS. 11-13), the movable member 18a pivots from the closed position (FIG. 11) to the open position (FIGS. 12-13) in a first direction about the first pivot axis 146a (e.g., clockwise and to the left as viewed from FIG. 12). In the second arrangement, the movable member 18a pivots from the closed position (FIG. 15) to the open position (FIGS. 16-17) in a second direction about the second pivot axis 154a (e.g., counterclockwise and to the right as viewed from FIG. 16). In the first and second arrangements, the wall 98a of the movable member 18a is positioned vertically across the access opening 38a of the base member 14a, as best shown in FIGS. 11 and 15.

Figure 18:
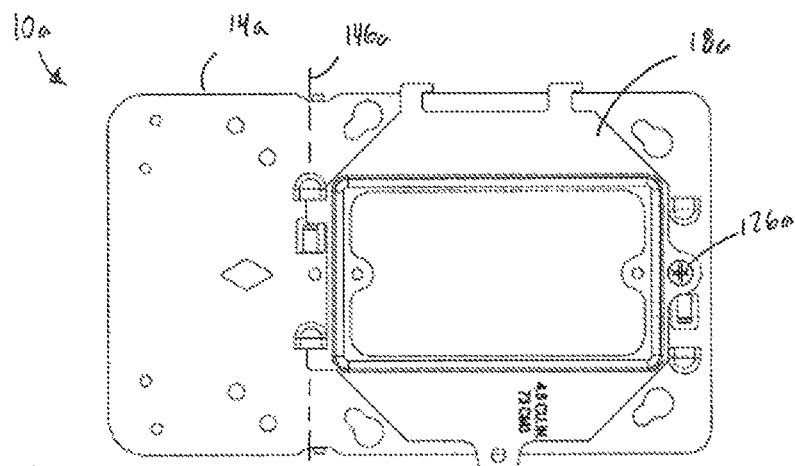
FIG. 18 is a front view of the hinged mud ring assembly of FIG. 11 showing the hinged mud ring assembly in a third arrangement and in a closed position.
Figure 19:
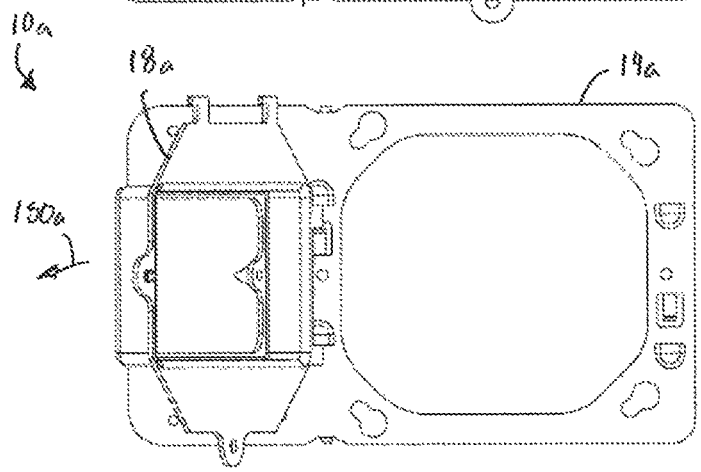
FIG. 19 is a front view of the hinged mud ring assembly of FIG. 11 showing the hinged mud ring assembly in the third arrangement and in an open position.
Figure 20:
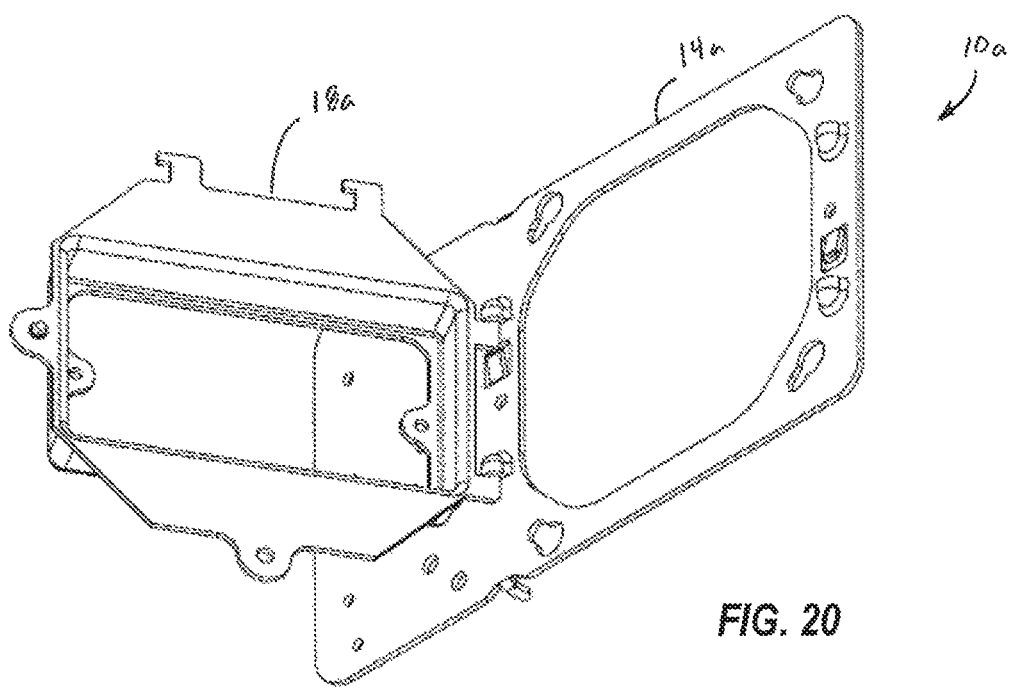
FIG. 20 is a perspective view of the hinged mud ring assembly of FIG. 11 showing the mud ring assembly in the third arrangement and in the open position.
Figure 21:
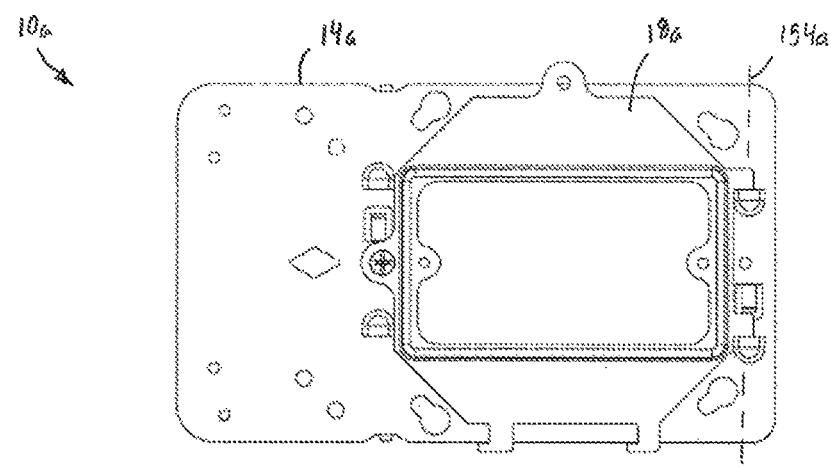
FIG. 21 is a front view of the hinged mud ring assembly of FIG. 11 showing the hinged mud ring assembly in a fourth arrangement and in a closed position.
Figure 22:
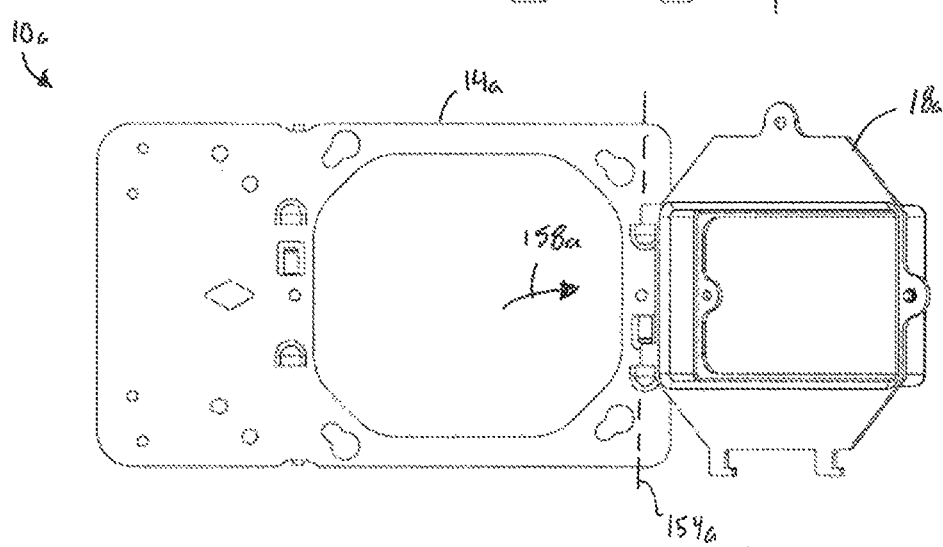
FIG. 22 is a front view of the hinged mud ring assembly of FIG. 11 showing the hinged mud ring assembly in the fourth arrangement and in an open position.
Figure 23:
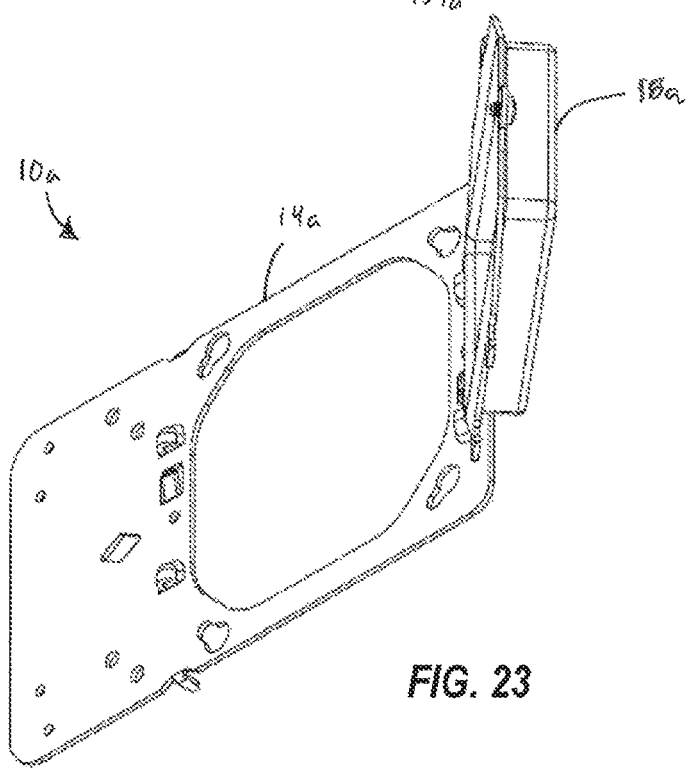
FIG. 23 is a perspective view of the hinged mud ring assembly of FIG. 11 showing the mud ring assembly in the fourth arrangement and in the open position.

Alternatively, the movable member 18a may be coupled to either the first and second hinge bodies 54a, 66a via the second hinge tabs 174, in either a third arrangement (see FIGS. 18-20) or a fourth arrangement (see FIGS. 21-23). The second hinge tabs 174 pivotably couple with the first and second hinge bodies 54a, 66a and the first and second resilient tabs 78, 82 in the same manner as the first hinge 134a. However, in the third and fourth arrangements, the wall 98a of the movable member 18a is positioned horizontally across the access opening 38a of the base member 14a. When the movable member 18a is in the third arrangement and pivoted to the closed position, the second closure flange 186 aligns with the first closure aperture 86a such that the closure fastener 126a may be threadingly received in the first closure aperture 86a to secure the movable member 18a in the closed position relative to the base member 14a, as best shown in FIG. 18. When the movable member 18a is in the fourth arrangement and pivoted to the closed position, a second closure aperture 190 of the second closure flange 186 aligns with the second closure aperture 90a of the base member 18a such that the closure fastener 126a may be threadingly received in the first closure aperture 86a to couple and secure the movable member 18a in the closed position relative to the base member 14a, as best shown in FIG. 21.

FIGS. 24-35 illustrate a mud ring assembly 10b according to another embodiment. The mud ring assembly 10b is similar to the mud ring assembly 10 described above with respect to FIGS. 1-10, and for the sake of brevity only differences will be described in detail. Similar features are identified with similar reference numbers, plus "b". The mud ring assembly 10b is a single gang mud ring assembly for supporting a single electrical device (not shown). In other embodiments, the mud ring assembly 10b may be a double gang mud ring assembly for supporting two electrical devices.

Figure 24:
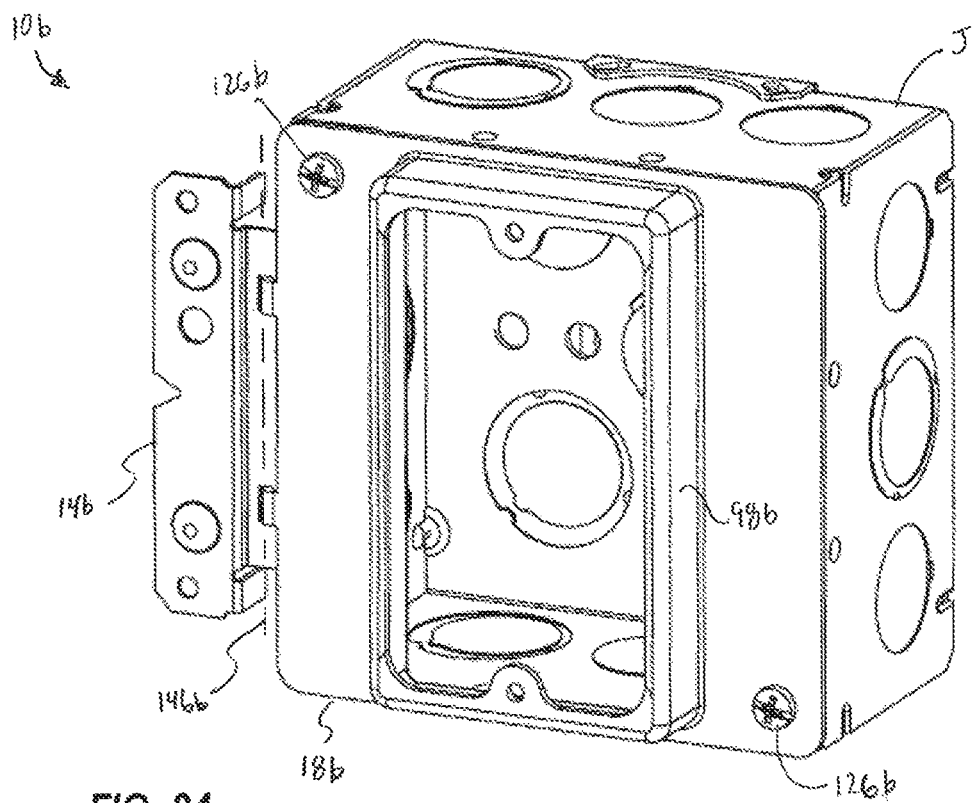
FIG. 24 is a perspective view of a hinged mud ring assembly in accordance with a third embodiment showing the hinged mud ring assembly in a closed position.
Figure 25:
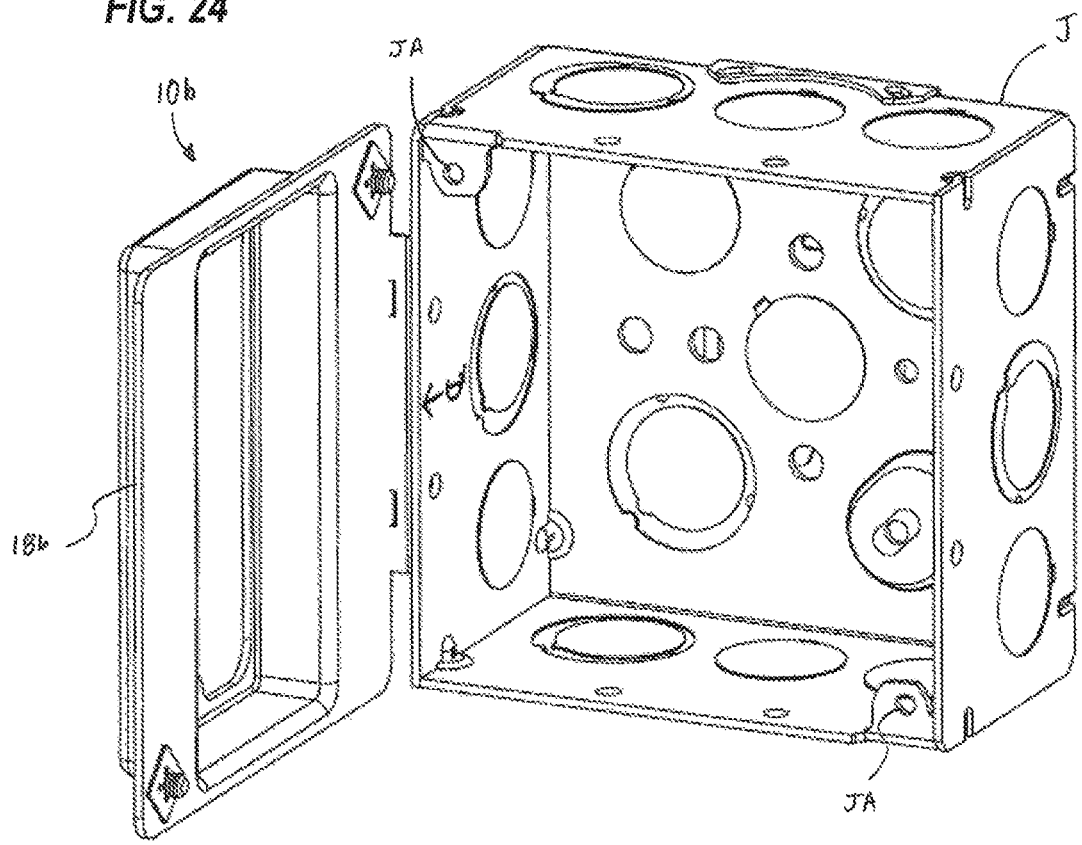
FIG. 25 is a perspective view of the hinged mud ring assembly of FIG. 24 showing the hinged mud ring assembly in an open position.
Figure 26:
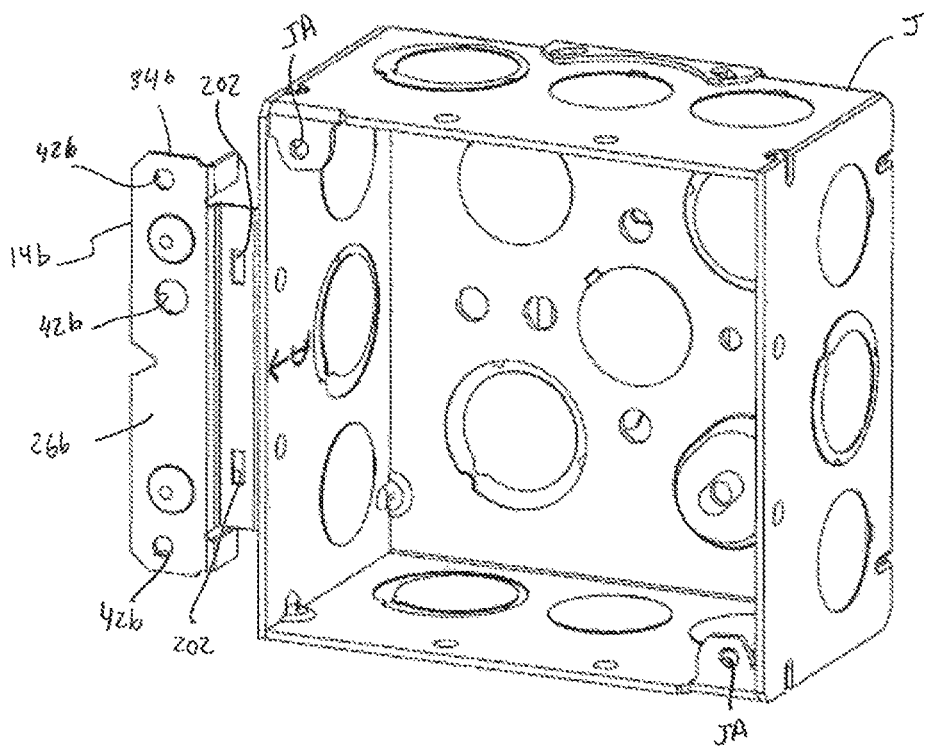
FIG. 26 is a perspective view of a base member of the hinged mud ring assembly of FIG. 24 showing the base member coupled to a junction box.

As best shown in FIG. 26, the base member 14b is coupled to a side of a junction box J (e.g., via welds, fasteners, etc.). In the illustrated embodiment, the base member 14b does not extend over the front opening of the junction box J like the base members 14, 14a of FIGS. 1-23. Rather, with reference to FIGS. 27-30, the movable member 18b includes cover flanges 170b extending from the second peripheral edge 110b of the wall 98b similar to the cover flanges 170 of the mud ring assembly 10a of FIGS. 11-23. Each of the cover flanges 170b defines a closure flange aperture 124b configured to align with a corresponding box aperture JA defined by the junction box J for threadingly receiving closure fasteners 126b to secure the movable member 18c in the closed position, as best shown in FIG. 24. The movable member 18b is directly coupled to the junction box J to secure the movable member 18b in the closed position (FIG. 24) (as opposed to being coupled to the base member 14b in the closed position). The box apertures JA defined by the junction box J may be the same ones that the slots 46, 46a of the base members 14, 14a of the embodiments of FIGS. 1-23 align with for coupling the base members 18, 18a of FIGS. 1-23 to the junction box J.

As best shown in FIGS. 27-30, two hinge tabs 134b protrude from the second peripheral edge 110b of the movable member 18b from one of the cover flanges 170b. The hinge tabs 134b curve downward away from the one of the cover flange 170b. Each of the hinge tabs 134b includes a securement projection 198 (FIGS. 28-30) extending from a distal end of the hinge tab 134b. The securement projection 198 may be bent between an unbent position (FIGS. 27-28), in which the securement projection 198 extends parallel from the distal end of the hinge tab 134b, and a bent position (FIGS. 29-31), in which the securement projection 198 is bent so as to extend perpendicular from the distal end of the hinge tab 134b.

Figure 27:
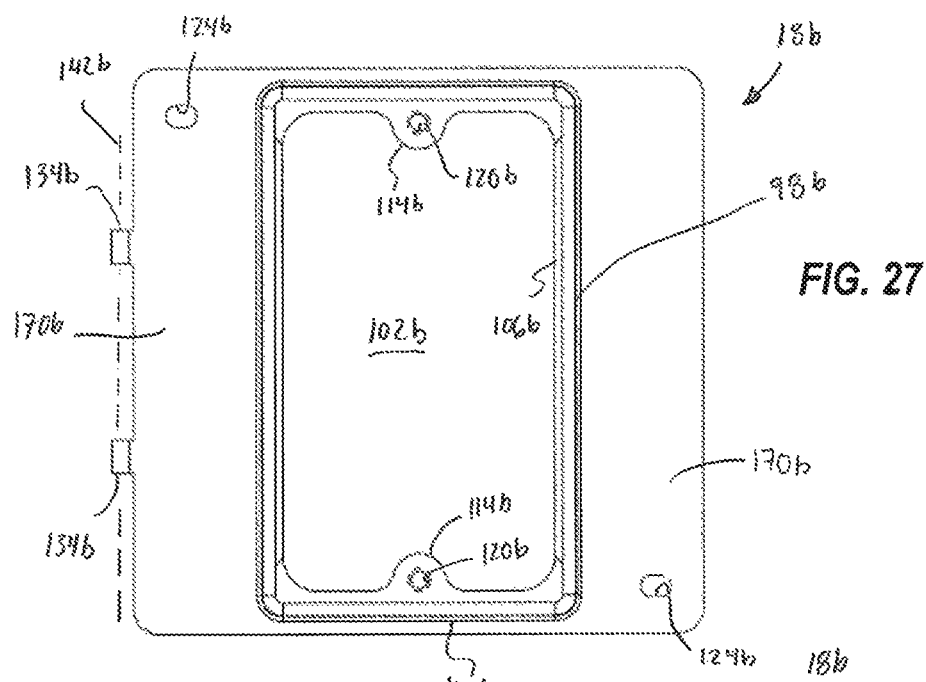
FIG. 27 is a front view of a movable member of the hinged mud ring assembly of FIG. 24 showing each of a plurality of securement projections in an unbent position.
Figure 28:
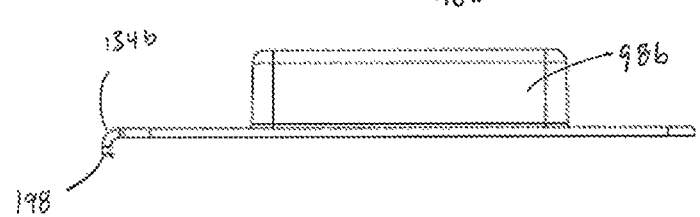
FIG. 28 is a side view of the movable member of FIG. 27 showing each of the securement projections in the unbent position.

During installation, the hinge tabs 134b may be inserted into corresponding hinge slots 202 defined by the base member 14c while each of the securement projections 198 is in the unbent position (FIGS. 27-28). Once the hinge tabs 134b are fully inserted into the hinge slots 202, each of the securement projections 198 may be bent to the bent position (FIGS. 29-31) to secure the movable member 18b relative to the base member 14b and the junction box J. Once secured, the movable member 18b may be pivoted about the pivot axis 146b between the open position (see FIGS. 25 and 34-35) and the closed position (see FIGS. 24 and 32-33).

Although not shown, the base member 14b may be coupled to another side of the junction box J (e.g., the opposite side to that shown), thus changing the pivot axis and the direction the movable member 18b pivots from the closed position to the open position relative to the base member 14b and the junction box J.

FIGS. 36-43 illustrate a mud ring assembly 10c according to another embodiment. The mud ring assembly 10c is similar to the mud ring assembly 10 described above with respect to FIGS. 1-10, and for the sake of brevity only differences will be described in detail. Similar features are identified with similar reference numbers, plus "c". In the embodiment of FIGS. 36-43, the mud ring assembly 10c is a double gang mud ring assembly for supporting a pair of electrical devices. In other embodiments (e.g., the mud ring assembly 10d shown in FIGS. 44-46), the mud ring assembly 10c may be a single gang mud ring assembly for supporting a single electrical device.

Figure 43:
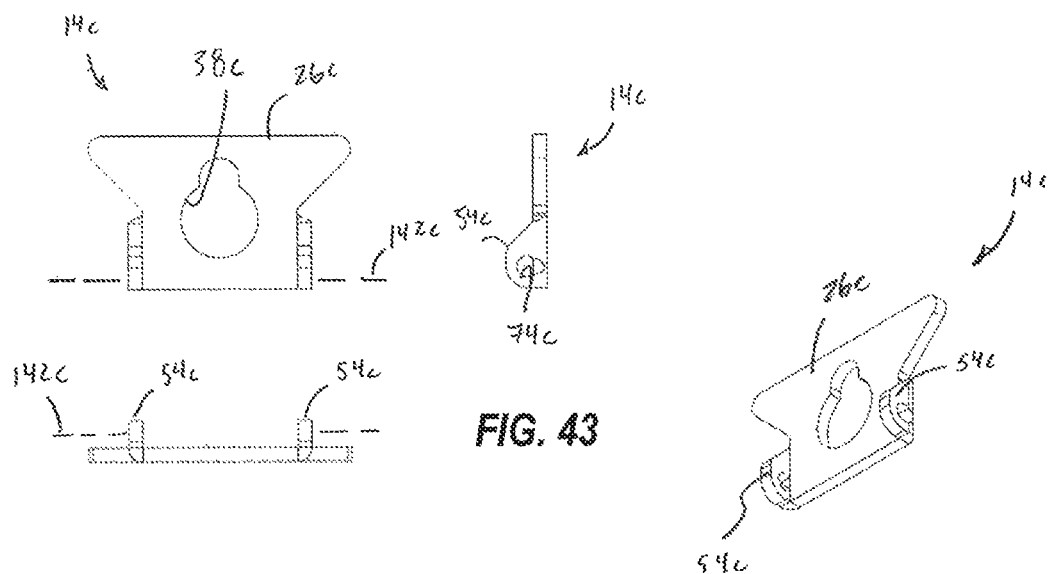
FIG. 43 includes a perspective view, a front view, and two side views of a base member of the hinged mud ring assembly of FIG. 36.

Referring to FIG. 43, the planar body 26c of the base member 14c defines a single slot 38c (e.g., a keyhole slot) for coupling the base member 14c to one of the box apertures JA of the junction box J via a fastener 214. The base member 14c further includes a pair of hinge bodies 54c extending upwardly from the planar body 26c of the base member 14c. Each of the hinge bodies 54c defines a hinge recess 74c. The hinge recesses 74c are aligned along a hinge axis 142c.

Figure 39:
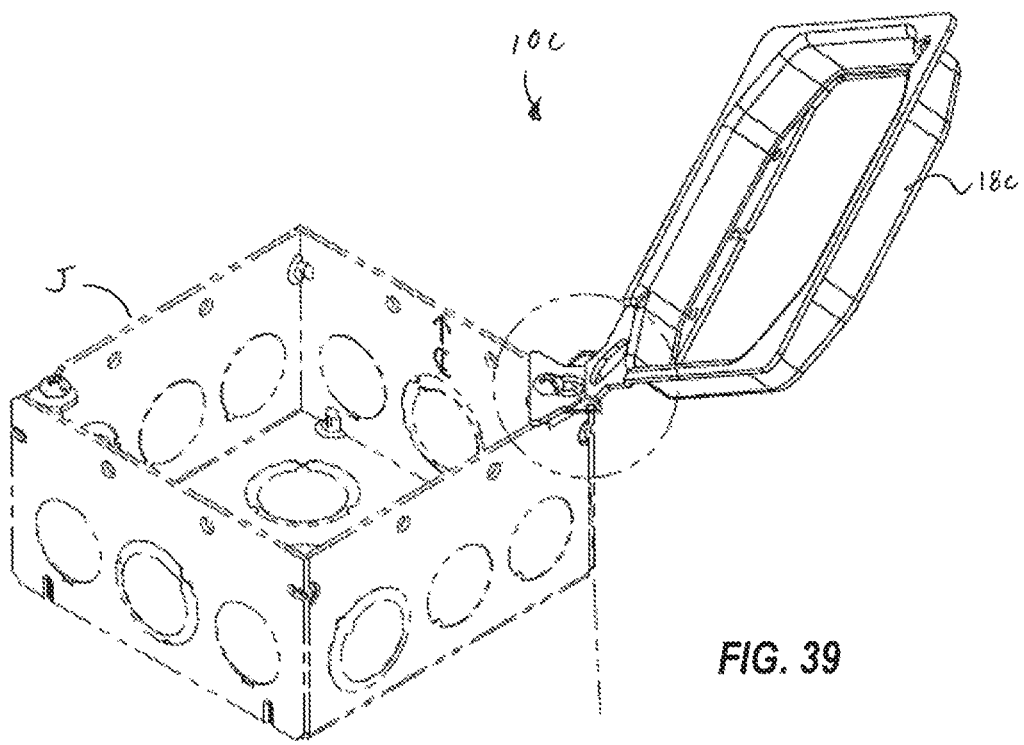
FIG. 39 is a perspective view of the hinged mud ring assembly and the junction box of FIG. 37 showing the hinged mud ring assembly in an open position.
Figure 40:
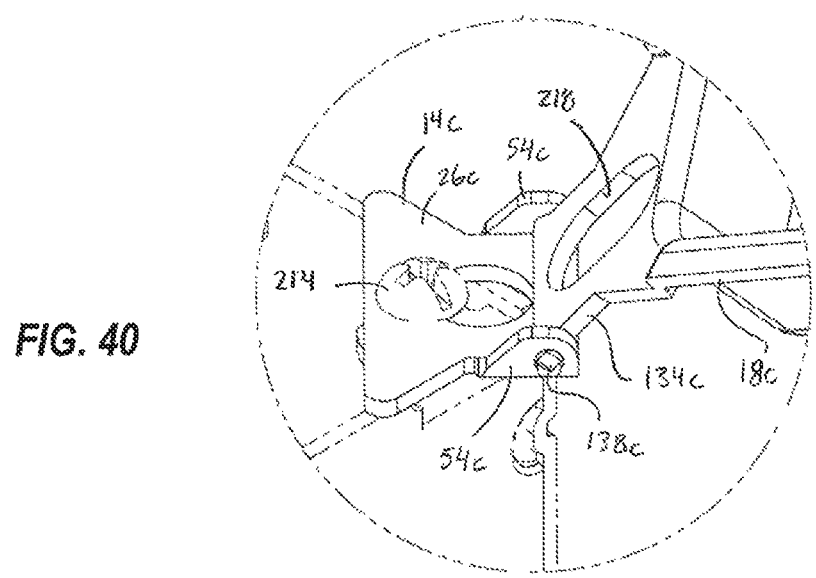
FIG. 40 is an enlarged perspective view of a portion of the hinged mud ring assembly of FIG. 36 taken from FIG. 39.
Figure 41:
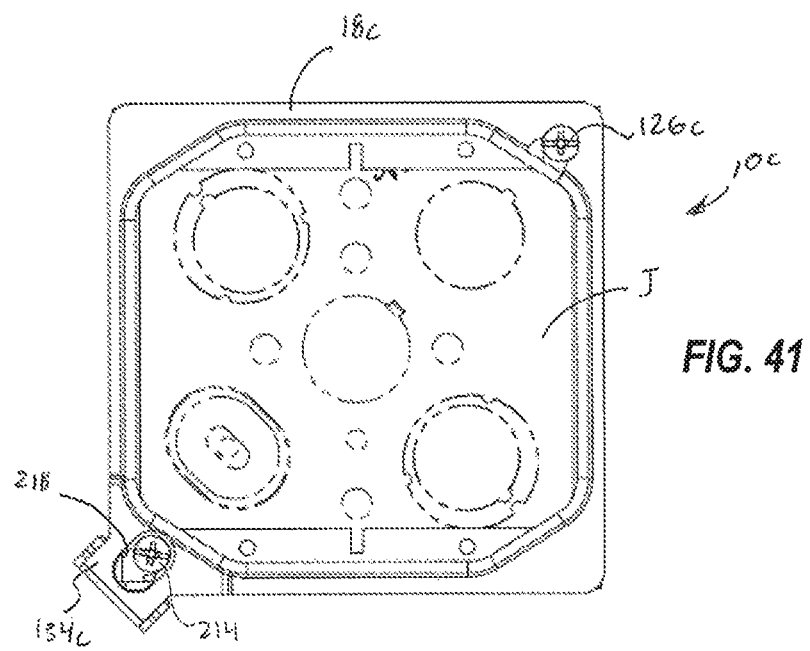
FIG. 41 is a front view of the hinged mud ring assembly and the junction box of FIG. 37 showing the hinged mud ring assembly coupled to an opposite corner of the junction box and in the closed position.

The base member 14c is configured to substantially fit within the perimeter of the front opening of the junction box J, as best shown in FIGS. 39 and 41. The base member 14c has a generally triangular shape. The base member 14c is arranged such that the hinge axis 142c passes through a single corner of the junction box J. The hinge axis 142c is transverse (i.e., non-coplanar) to each of the sides of the junction box J.

Figure 36:
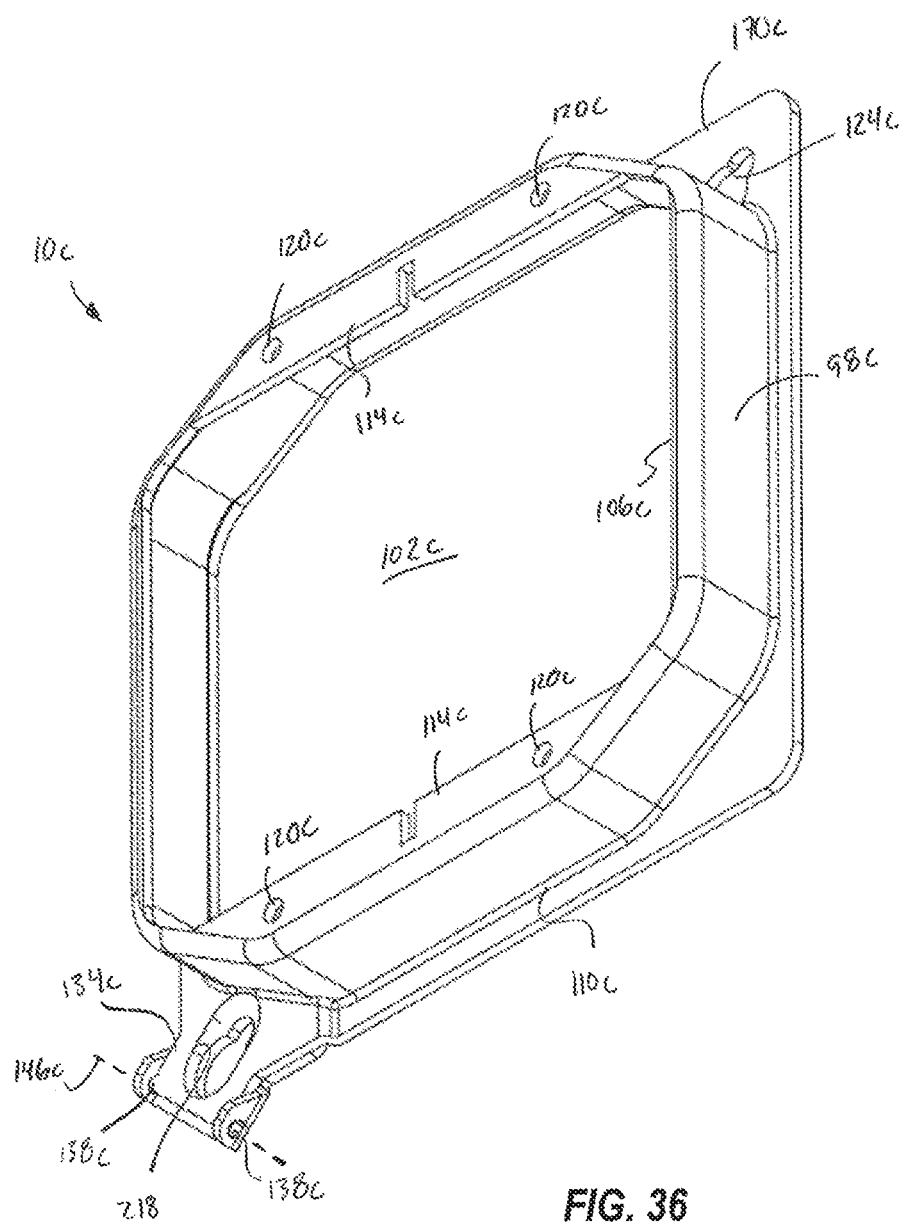
FIG. 36 is a perspective view of a hinged mud ring assembly in accordance with a fourth embodiment.
Figure 37:
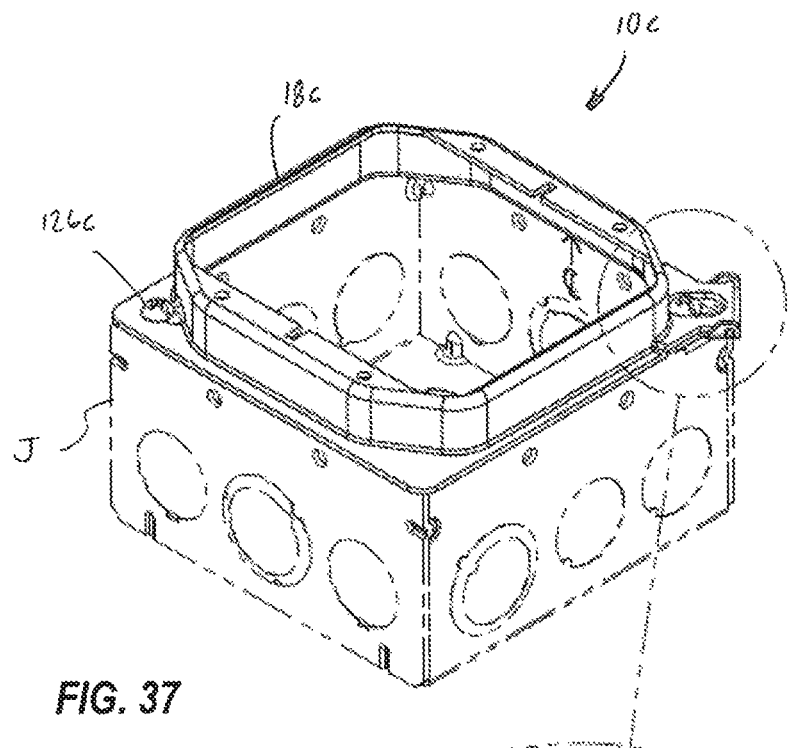
FIG. 37 is a perspective view of the hinged mud ring assembly of FIG. 36 showing the hinged mud ring assembly coupled to a junction box and in a closed position.
Figure 38:
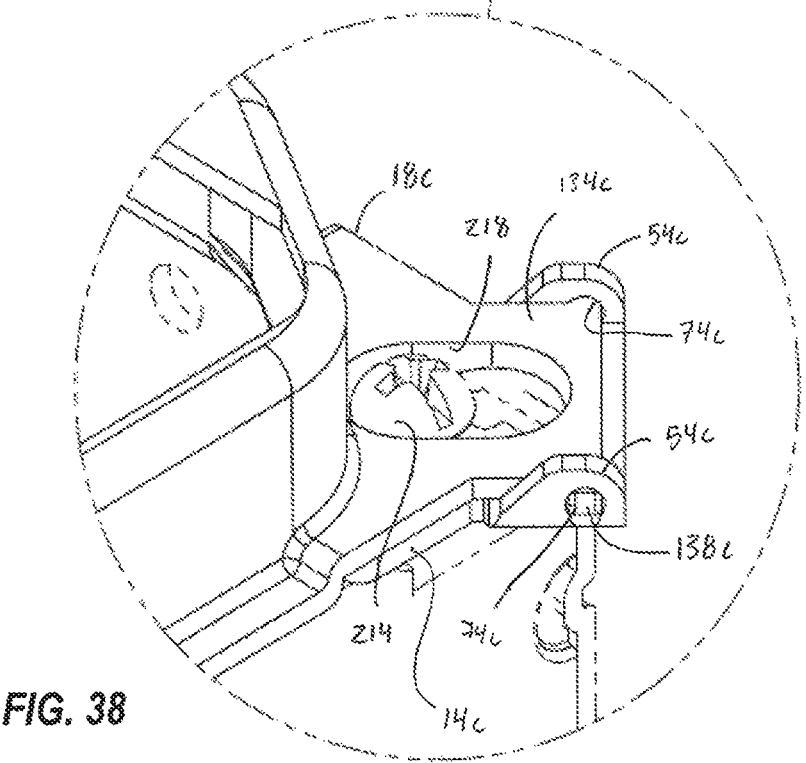
FIG. 38 is an enlarged perspective view of a portion of the hinged mud ring assembly of FIG. 36 taken from FIG. 37.

As shown in FIG. 36, a single hinge tab 134c extends from the cover flange 170c of the movable member 18c at one corner of the movable member 18c. Two hinge projections 138c extend from opposite sides of the hinge tab 134c along the hinge axis 142c, and are spaced so as to be receivable within the hinge recesses 74c of the hinge bodies 54c to pivotably couple the movable cover to the base member 14c about the hinge axis 142c. The hinge tab 134c further defines a clearance aperture 218 (see FIG. 40). The clearance aperture 218 is sized to allow the head of the fastener 214 coupling the base member 14c to the junction box J to pass therethrough when the movable member 18c is in the closed position (see FIGS. 37-38).

Referring still to FIG. 36, the corner of the movable member 18c diagonally opposite the hinge tab 134c defines a closure flange aperture 124c. The closure flange aperture 124c aligns with the opposing box aperture JA of the junction box J when the movable member 18c is in the closed position (see FIG. 37) to threadingly receive a closure fastener 126c to secure the movable member 18c in the closed position. The closure fastener 126c couples the movable member 18c directly to the junction box J to secure the movable member 18c in the closed position (as compared to coupling the movable member 18c to the base member 14c to secure the movable member 18c in the closed position like in the embodiments of FIGS. 1-23)

Figure 42:
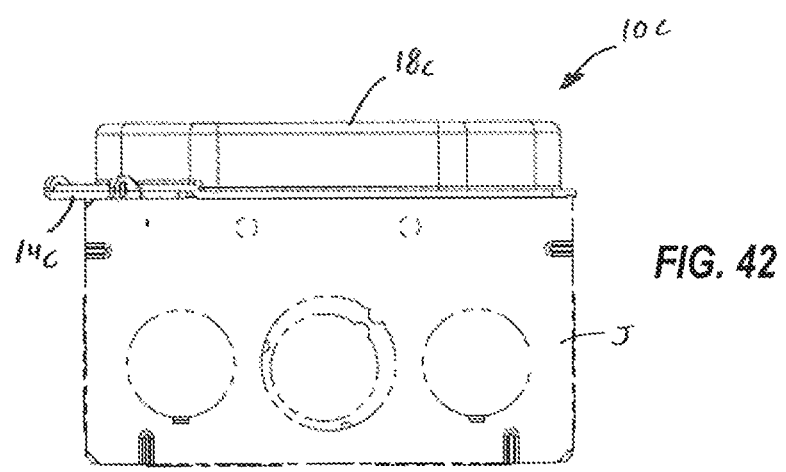
FIG. 42 is a side view of the hinged mud ring assembly and the junction box of FIG. 41 showing the hinged mud ring assembly in the closed position.

During installation, the base member 14c may be coupled to a first corner of the junction box J via the box aperture JA at the first corner, as shown in FIGS. 37-40. Alternatively, the base member 14c may be coupled to a second corner of the junction box J diagonally opposite from the first corner at the box aperture JA at the second corner, as shown in FIGS. 41-42. Depending on which way the operator would like the movable member 18c to open to allow easiest access to the back of the electric device coupled to the movable member 18c.

Figure 44:
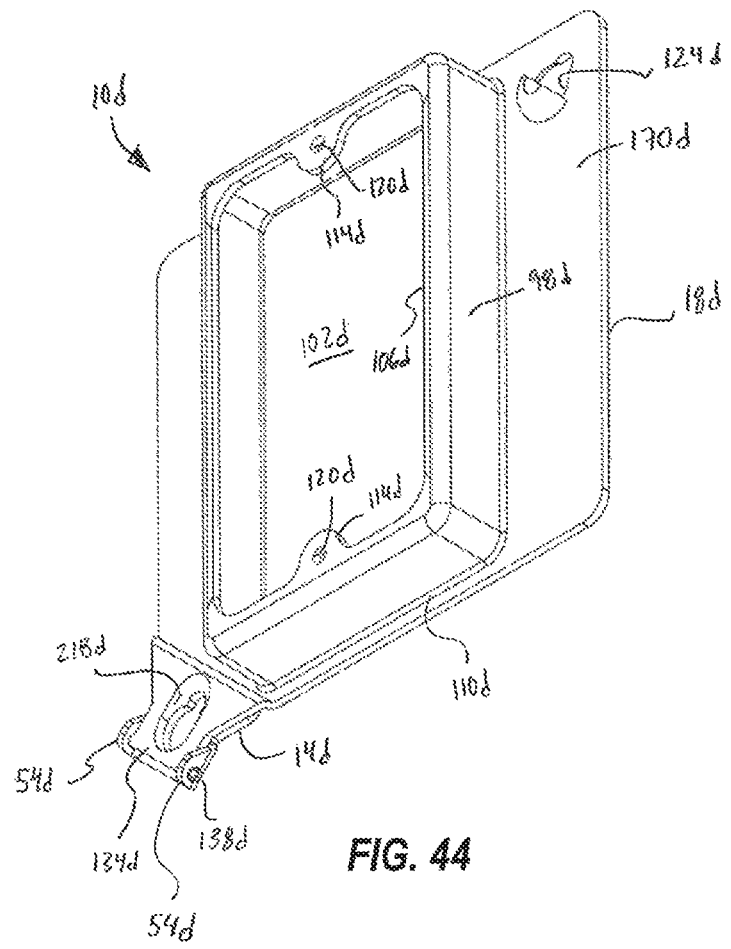
FIG. 44 is a perspective view of a hinged mud ring assembly in accordance with a fifth embodiment.
Figure 45:
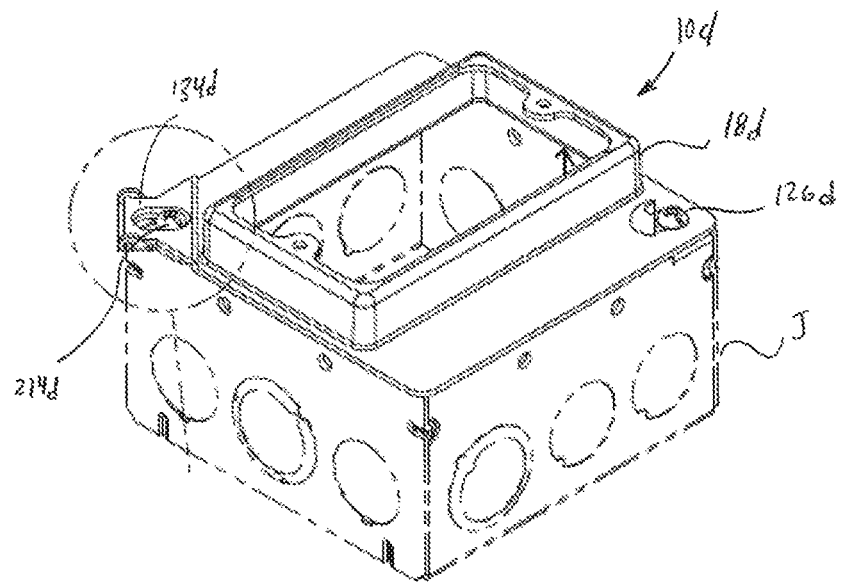
FIG. 45 is a perspective view of the hinged mud ring assembly of FIG. 44 coupled to a junction box and in a closed position.
Figure 46:
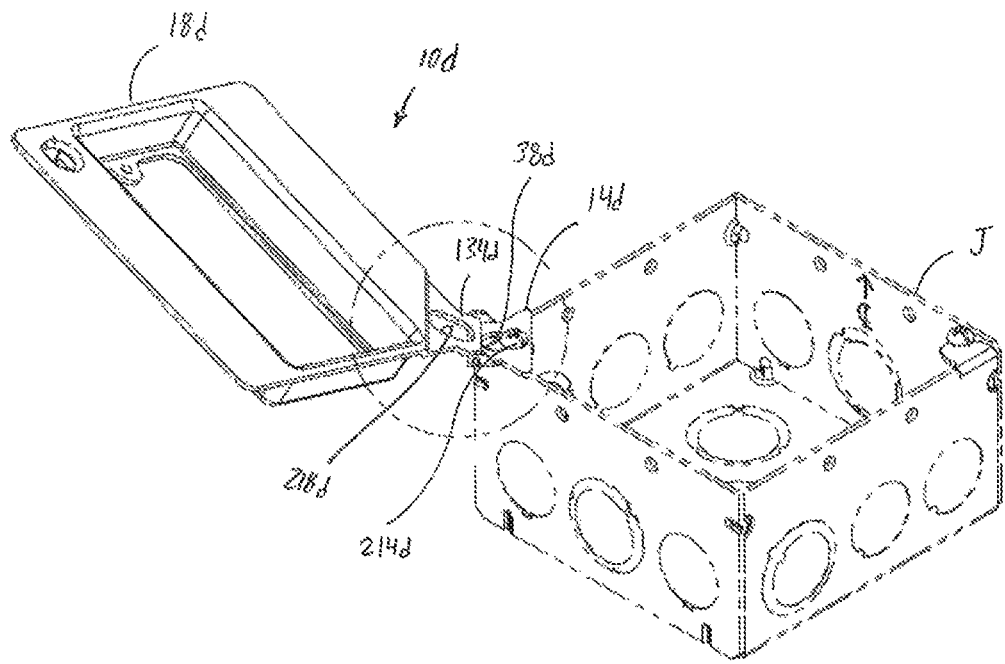
FIG. 46 is a perspective view of the hinged mud ring assembly and the junction box of FIG. 45 showing the hinged mud ring assembly in an open position.

FIGS. 44-46 illustrate a mud ring assembly 10d according to another embodiment. The mud ring assembly 10d is substantially identical to the mud ring assembly 10c described above with respect to FIGS. 36-43, and for the sake of brevity only differences will be described in detail. Similar features are identified with similar reference numbers, plus "d". The only substantive difference is that the mud ring assembly 10c is a single gang mud ring assembly for supporting a single electrical device (not shown). The base member 14d of the mud ring assembly 10d of FIGS. 36-43 is identical the base member 14c of the mud ring assembly 10c of FIGS. 44-46. Using the same base member 14c for both mud ring assemblies 10c, 10d of FIGS. 36-46 reduces the total number of different parts required to be manufactured for both single and double gang versions of the product.

The hinged mud ring cover assemblies 10, 10a, 10b, 10c, 10d allow access to a front and back of the electrical device during installation and wiring of the electrical device. This also allows an installer to be free to use both hands during the installation process.

The embodiments described above and illustrated in the figures are presented by way of example only and are not intended as a limitation upon the concepts and principles presented herein. As such, it will be appreciated that variations and modifications exist within the scope and spirit of one or more independent aspects as described.

What is claimed is:

1. A mud ring assembly for supporting an electrical device, the mud ring assembly comprising:
   a base member configured to be coupled to a junction box having a perimeter including a first corner and a second corner, the base member configured to extend around only a portion of the junction box perimeter; and
   a movable member configured to support the electrical device, the movable member being pivotably connected to the base member and pivotable relative to the base member between a closed position in which a back of the electrical device is enclosed in the junction box and an open position in which the back of the electrical device is accessible, the movable member being securable in the closed position.

2. The mud ring assembly of claim 1, wherein the junction box includes a first corner and a second corner diagonally across from one another, wherein the base member is configured to extend around the first corner without extending over the second corner.

3. The mud ring assembly of claim 1, wherein the base member includes a slot configured to receive a fastener for coupling the base member to the junction box.

4. The mud ring assembly of claim 1, wherein the movable member includes a projection movable between a bent position and an unbent position, the projection configured to secure the movable member against uncoupling from the base member.

5. The mud ring assembly of claim 1, wherein the junction box includes an edge forming the perimeter, the base member configured to expose at least a portion of the edge when the movable member is in the open position.

6. The mud ring assembly of claim 1, wherein movable member includes an aperture and, when the movable member is in the closed position, the aperture is configured to be positioned proximate a corner of the junction box.

7. The mud ring assembly of claim 1, wherein the base member includes a first slot and the movable member includes a second slot, the second slot aligned with the first slot while the movable member is in the closed position, the first slot and the second slot configured to receive a fastening member extending through both the first slot and the second slot while the movable member is in the closed position.

8. The mud ring assembly of claim 1, wherein the base member is configured to be coupled to a portion of the junction box proximate a corner.

9. The mud ring assembly of claim 8, wherein the movable member is configured to be secured in the closed position by engaging a portion of the junction box opposite the portion to which the base member is coupled.

10. A mud ring assembly comprising:
    a base member having a surface, the base member is configured to be coupled to a junction box having an opening defined by an outer perimeter, such that the base member exposes the opening, and the surface extends over a first portion of the outer perimeter and not over a second portion of the outer perimeter, the surface having a perimeter less than the outer perimeter; and
    a movable member configured to support an electrical device, the movable member being movably connected to the base member and movable relative to the base member between a closed position in which a back of the electrical device is enclosed in the junction box and an open position permitting access to the back of the electrical device.

11. The mud ring assembly of claim 10, wherein the first edge and the second edge are configured to be positioned proximate an aperture of the junction box, the aperture configured to receive a fastening member to couple the base member to the junction box.

12. The mud ring assembly of claim 10, wherein the base member includes a slot positioned within the surface, the slot configured to receive a fastening member to coupled the base member to the junction box.

13. The mud ring assembly of claim 10, wherein the movable member includes a projection movable between a bent position and an unbent position, the projection configured to secure the movable member against uncoupling from the base member.

14. The mud ring assembly of claim 10, wherein the base member includes a first slot and the movable member includes a second slot configured to align with the first slot in the closed position and receive a fastening member which extends through both the first slot and the second slot.

15. The mud ring assembly of claim 10, wherein the movable member is configured to couple to the junction box proximate the second portion of the junction box perimeter.

16. The mud ring assembly of claim 10, wherein the base member is configured to coupled to first corner of the junction box proximate to the first portion of the junction box perimeter and the movable member is configured to couple to a second corner of the junction box proximate to the second portion of the junction box perimeter, the first corner diagonal from the second corner.

* * * * *